US009462416B2

(12) United States Patent
Akitomi et al.

(10) Patent No.: US 9,462,416 B2
(45) Date of Patent: Oct. 4, 2016

(54) INFORMATION PROCESSING SYSTEM, MANAGEMENT SERVER AND INFORMATION PROCESSING METHOD

(75) Inventors: Tomoaki Akitomi, Kokubunji (JP); Koji Ara, Higashiyamato (JP); Nobuo Sato, Saitama (JP); Satomi Tsuji, Koganei (JP); Kazuo Yano, Hino (JP)

(73) Assignee: HITACHI, LTD., Tokyo (JP)

( * ) Notice: Subject to any disclaimer, the term of this patent is extended or adjusted under 35 U.S.C. 154(b) by 622 days.

(21) Appl. No.: 13/562,350

(22) Filed: Jul. 31, 2012

(65) Prior Publication Data

US 2013/0053086 A1    Feb. 28, 2013

(30) Foreign Application Priority Data

Aug. 22, 2011 (JP) ................................. 2011-180600

(51) Int. Cl.
*G06Q 10/00* (2012.01)
*H04W 4/02* (2009.01)
(Continued)

(52) U.S. Cl.
CPC ......... *H04W 4/023* (2013.01); *G06Q 10/0639* (2013.01); *G06Q 10/105* (2013.01); *H04W 4/026* (2013.01); *H04W 4/08* (2013.01)

(58) Field of Classification Search
CPC ..... H04W 4/023; H04W 4/026; H04W 4/08; G06Q 10/0639; G06Q 10/105
USPC .......................................................... 705/7.37
See application file for complete search history.

(56) References Cited

U.S. PATENT DOCUMENTS

| 7,376,969 B1 * | 5/2008 | Njemanze | G06F 21/55 |
| | | | 709/224 |
| 7,676,034 B1 * | 3/2010 | Wu | H04M 3/5233 |
| | | | 379/265.01 |

(Continued)

FOREIGN PATENT DOCUMENTS

| JP | 2002-109161 | 4/2002 |
| JP | 2010-198261 | 9/2010 |

OTHER PUBLICATIONS

Mining face-to-face interaction networks using sociometric badges: Predicting productivity in an IT configuration task, L Wu, BN Waber, S Aral, E Brynjolfsson, 2008—papers.ssrn.com.*

(Continued)

*Primary Examiner* — Jonathan G Sterrett
(74) *Attorney, Agent, or Firm* — Baker Botts L.L.P.

(57) ABSTRACT

An information processing system including plural terminals, a base station to communicate with the terminals, and a management server coupled via a network to the base station, in which each terminal includes a behavioral information sensor to acquire behavioral information on the person wearing the terminal, and the management server retains the predefined relations among the persons within the organization, receives and retains the behavioral information from each terminal, calculates the behavioral characteristic quantity showing behavioral characteristics of each person relative to other persons based on the behavioral information, sums the calculated behavioral characteristic quantities for each of the defined relations between the person and the other persons, and when information showing changes in the still non-implemented defined relations is acquired, estimates the behavioral characteristic quantity of the person after changing the defined relation according to the acquired information, based on the acquired information and the behavioral characteristic quantity.

18 Claims, 27 Drawing Sheets

(51) Int. Cl.
  *G06Q 10/06* (2012.01)
  *G06Q 10/10* (2012.01)
  *H04W 4/08* (2009.01)

(56) References Cited

U.S. PATENT DOCUMENTS

| | | | | |
|---|---|---|---|---|
| 7,751,878 | B1* | 7/2010 | Merkle | A61B 5/04 600/544 |
| 8,180,642 | B2* | 5/2012 | Bouchard et al. | 704/256 |
| 2002/0165763 | A1* | 11/2002 | Friedlander et al. | 705/11 |
| 2006/0184410 | A1* | 8/2006 | Ramamurthy | G06Q 10/10 706/8 |
| 2006/0282303 | A1* | 12/2006 | Hale | G06Q 10/063 705/7.11 |
| 2007/0005654 | A1* | 1/2007 | Schachar | G06Q 10/00 |
| 2008/0082393 | A1* | 4/2008 | Ozzie | G06F 17/30575 705/7.11 |
| 2008/0208671 | A1* | 8/2008 | Ehrlich | G06Q 30/02 705/7.14 |
| 2009/0006608 | A1* | 1/2009 | Gupta | G06Q 10/10 709/224 |
| 2009/0106040 | A1* | 4/2009 | Jones | G06Q 50/01 705/319 |
| 2009/0228318 | A1* | 9/2009 | Ara | G06Q 10/06398 705/7.42 |
| 2009/0313346 | A1* | 12/2009 | Sood | G06Q 10/10 709/207 |
| 2011/0072052 | A1* | 3/2011 | Skarin | G06Q 10/10 707/794 |
| 2011/0270845 | A1* | 11/2011 | Lin et al. | 707/748 |

OTHER PUBLICATIONS

"Sociometric badges: wearable technology for measuring human behavior", D Olguín—2007—dspace.mit.edu, available at: http://dspace.mit.edu/handle/1721.1/42169.*

Sociometric badges: State of the art and future applications DO Olguin, AS Pentland—2007—media.mit.edu.*

Meeting mediator: enhancing group collaborationusing sociometric feedback T Kim, A Chang, L Holland, AS Pentland—Proceedings of the 2008 ACM . . . , 2008—dl.acm.org.*

Productivity through coffee breaks: Changing social networks by changing break structure BN Waber, D Olguin Olguin, T Kim . . .—Available at SSRN . . . , 2010—papers.ssrn.com.*

Social sensors for automatic data collection DO Olguín, AS Pentland—AMCIS 2008 Proceedings, 2008—aisel.aisnet.org.*

Organizational engineering using sociometric badges BN Waber, D Olguin Olguin, T Kim . . .—Available at SSRN . . . , 2007—papers.ssrn.com.*

Social network analysis for organizations NM Tichy, ML Tushman, C Fombrun—Academy of management review, 1979—amr.aom.org.*

Yoshihiro Wakisaka, et al., Beam-Scan Sensor Node: Reliable Sensing of Human Interactions in Organization, IEEE 2009.

Lynn Wu et al., Mining Face-To-Face Interaction Networks Using Sociometric Badges: Predicting Productivity in an IT Configuration Task, International Conference on Information Systems, Dec. 14, 2008.

JP Office Action for Japanese Application No. 2011-180600, issued on Jun. 10, 2014.

* cited by examiner

FIG. 4

TEAMINFO

| USER ID | UNAME | GROUP ID | GLEADER | TEAM ID | TLEADER | POS ID | SUPERIOR ID | FOLLOWER ID |
|---|---|---|---|---|---|---|---|---|
| 0 | W0 | – | 0 | – | 0 | 1 | – | W1, W8 |
| 1 | W1 | A | 1 | – | 0 | 2 | W0 | W2, W5 |
| 2 | W2 | A | 0 | A1 | 1 | 3 | W1 | W3, W4 |
| 3 | W3 | A | 0 | A1 | 0 | 4 | W2 | – |
| 4 | W4 | A | 0 | A1 | 0 | 4 | W2 | – |
| 5 | W5 | A | 0 | A2 | 1 | 3 | W1 | W6, W7 |
| 6 | W6 | A | 0 | A2 | 0 | 4 | W5 | – |
| 7 | W7 | A | 1 | A2 | 0 | 4 | W5 | – |
| 8 | W8 | B | 0 | – | 0 | 2 | W0 | W9, W11 |
| 9 | W9 | B | 0 | B1 | 1 | 3 | W8 | W10 |
| 10 | W10 | B | 0 | B1 | 0 | 4 | W9 | – |
| 11 | W11 | B | 0 | B2 | 1 | 3 | W8 | W12 |
| 12 | W12 | B | 0 | B2 | 0 | 4 | W11 | – |

FIG. 6

TEAM RELATION INDEX (TRI)

| | SAME GROUP | OTHER GROUPS | |
|---|---|---|---|
| | | OTHER GROUP (og) | OTHER TEAM (ot) |
| BOSS AT n LEVEL | sn | ogsn | otsn |
| BOSS ON 2nd LEVEL (1 RANK HIGHER BOSS {BOSS OF BOSS}) | s2 | ogs2 | ots2 |
| DIRECT BOSS | s1 | ogs1 | ots1 |
| SAME LEVEL | p | ogp | otp |
| DIRECT SUBORDINATE | f1 | ogf1 | otf1 |
| SUBORDINATE BELOW 2nd LEVEL (SUBORDINATE OF DIRECT SUBORDINATE) | f2 | ogf2 | otf2 |
| SUBORDINATE BELOW n LEVEL | fn | ogfn | otfn |

FACE-TO-FACE LIST 1

FACE-TO-FACE LIST 2

FIG. 11

FACE-TO-FACE LIST 3

| TIME | SELF-ID | FACE-TO-FACE ID1 | FACE-TO-FACE ID2 | FACE-TO-FACE ID3 | ... |
|---|---|---|---|---|---|
| 12:00 | 1 | 2 | 3 | | ... |
| 12:00 | 2 | 1 | 3 | | ... |
| 12:00 | 3 | 1 | 2 | | ... |
| 12:00 | 4 | 5 | | | ... |
| 12:00 | 5 | 4 | | | ... |
| ... | ... | ... | ... | ... | ... |

FIG. 12

ACTIVITY LIST 3

| TIME | SELF-ID | ACTIVITY STATUS |
|---|---|---|
| 12:00 | 1 | 0 |
| 12:01 | 1 | 1 |
| 12:02 | 1 | 1 |
| 12:03 | 1 | 1 |
| 12:04 | 1 | 0 |
| ... | ... | ... |

FIG. 13

2-PERSON FACE-TO-FACE TIME MATRIX (PCM)

|  | OTHER PARTY ACTIVITY | OTHER PARTY NON-ACTIVITY |
|---|---|---|
| SELF ACTIVITY | BIDIRECTIONAL TIME (RCH2) | PITCHER TIME (RCH3) |
| SELF NON-ACTIVITY | CATCHER TIME (RCH4) | SIT TOGETHER TIME (RCH5) |

FACE-TO-FACE TIME (RCH1)

FIG. 14

FACE-TO-FACE ACTIVITY TRANSITION STATUS MATRIX (MATM)

| | | PRE-STATE | | | |
|---|---|---|---|---|---|
| | | SELF NON-ACTIVITY | | SELF ACTIVITY | |
| | | OTHER PARTY NON-ACTIVITY | OTHER PARTY ACTIVITY | OTHER PARTY NON-ACTIVITY | OTHER PARTY ACTIVITY |
| POST-STATE | SELF NON-ACTIVITY | ST11 | ST12 | ST13 | ST14 |
| | SELF ACTIVITY | ST21 | ST22 | ST23 | ST24 |

FIG. 15

FACE-TO-FACE TIME MATRIX (RCHMM1)

| ID | 0 | 1 | 2 | 3 | 4 | 5 | 6 | 7 | 8 | 9 | 10 | 11 | 12 |
|---|---|---|---|---|---|---|---|---|---|---|---|---|---|
| 0  |   | 5 | 0 | 0 | 0 | 0 | 0 | 0 | 1 | 0 | 0 | 0 | 0 |
| 1  | 5 |   | 20| 0 | 0 | 15| 0 | 0 | 0 | 0 | 0 | 0 | 0 |
| 2  | 0 | 20|   | 12| 10| 0 | 0 | 0 | 0 | 0 | 0 | 0 | 0 |
| 3  | 0 | 0 | 12|   | 4 | 0 | 0 | 0 | 0 | 0 | 0 | 0 | 0 |
| 4  | 0 | 0 | 10| 4 |   | 10| 0 | 0 | 0 | 0 | 0 | 0 | 0 |
| 5  | 0 | 15| 0 | 0 | 10|   | 3 | 1 | 0 | 0 | 0 | 0 | 0 |
| 6  | 0 | 0 | 0 | 0 | 0 | 3 |   | 0 | 0 | 0 | 0 | 0 | 0 |
| 7  | 0 | 0 | 0 | 0 | 0 | 1 | 0 |   | 0 | 0 | 0 | 0 | 0 |
| 8  | 1 | 0 | 0 | 0 | 0 | 0 | 0 | 0 |   | 0 | 0 | 10| 0 |
| 9  | 0 | 0 | 0 | 0 | 0 | 0 | 0 | 0 | 0 |   | 8 | 0 | 0 |
| 10 | 0 | 0 | 0 | 0 | 0 | 0 | 0 | 0 | 0 | 8 |   | 0 | 0 |
| 11 | 0 | 0 | 0 | 0 | 0 | 0 | 0 | 0 | 10| 0 | 0 |   | 12|
| 12 | 0 | 0 | 0 | 0 | 0 | 0 | 0 | 0 | 0 | 0 | 0 | 12|   |

FIG. 16

TEAM RELATION CHARACTERISTICS LIST (TRCL)

| SELF ID | DIRECT SUBORDINATE F1 ||||| SUBORDINATE 2 LEVELS LOWER |||
|---|---|---|---|---|---|---|---|---|
| | PERSONS | FACE-TO-FACE TIME | PITCHER TIME | ... | PERSONS | FACE-TO-FACE TIME | ... |
| 0 | 2 | 1 | 7 | ... | 4 | 20 | ... |
| 1 | 2 | 12 | 28 | ... | 4 | 10 | ... |
| 2 | 2 | 21 | 6 | ... | 0 | - | ... |
| 3 | 0 | - | - | ... | 0 | - | ... |
| 4 | 0 | - | 8 | ... | 0 | - | ... |
| 5 | 2 | 12 | - | ... | 0 | - | ... |
| 6 | 0 | - | - | ... | 0 | - | ... |
| 7 | 0 | - | 5 | ... | 0 | - | ... |
| 8 | 2 | 17 | 36 | ... | 2 | 5 | ... |
| 9 | 1 | 10 | - | ... | 0 | - | ... |
| 10 | 0 | - | 38 | ... | 0 | - | ... |
| 11 | 1 | 28 | - | ... | 0 | - | ... |
| 12 | 0 | - | - | ... | 0 | - | ... |

FIG. 17

INDIVIDUAL CHARACTERISTICS LIST (ICL)

| SELF ID | WEAR TIME | ... | DIRECT SUBORDINATE ||||||| SUBORDINATE 2 LEVELS LOWER |||
|---|---|---|---|---|---|---|---|---|---|---|---|
| | | | PERSONS | FACE-TO-FACE TIME | PITCHER TIME | CATCHER TIME | BIDIRECTIONAL TIME | SYNCH LEVEL | ... | PERSONS | FACE-TO-FACE TIME | ... |
| 0 | 480 | ... | 2 | 1 | 7 | 40 | 15 | 35 | ... | 4 | 20 | ... |
| 1 | 350 | ... | 2 | 12 | 28 | 4 | 26 | 18 | ... | 4 | 10 | ... |
| 2 | 200 | ... | 2 | 21 | 6 | 10 | 22 | 40 | ... | 0 | - | ... |
| 3 | 700 | ... | 0 | - | - | - | - | - | ... | 0 | - | ... |
| 4 | 480 | ... | 0 | - | - | - | - | - | ... | 0 | - | ... |
| 5 | 350 | ... | 2 | 12 | 8 | 22 | 23 | 8 | ... | 0 | - | ... |
| 6 | 200 | ... | 0 | - | - | - | - | - | ... | 0 | - | ... |
| 7 | 450 | ... | 0 | - | - | - | - | - | ... | 0 | - | ... |
| 8 | 480 | ... | 2 | 17 | 5 | 17 | 22 | 1 | ... | 2 | 5 | ... |
| 9 | 350 | ... | 1 | 10 | 36 | 16 | 1 | 12 | ... | 0 | - | ... |
| 10 | 200 | ... | 0 | - | - | - | - | - | ... | 0 | - | ... |
| 11 | 150 | ... | 1 | 28 | 38 | 40 | 30 | 2 | ... | 0 | - | ... |
| 12 | 500 | ... | 0 | - | - | - | - | - | ... | 0 | - | ... |

1701, 1702, 1703

STAR TYPE (COHESION: 1)

MESH TYPE (COHESION: 5)

FIG. 29
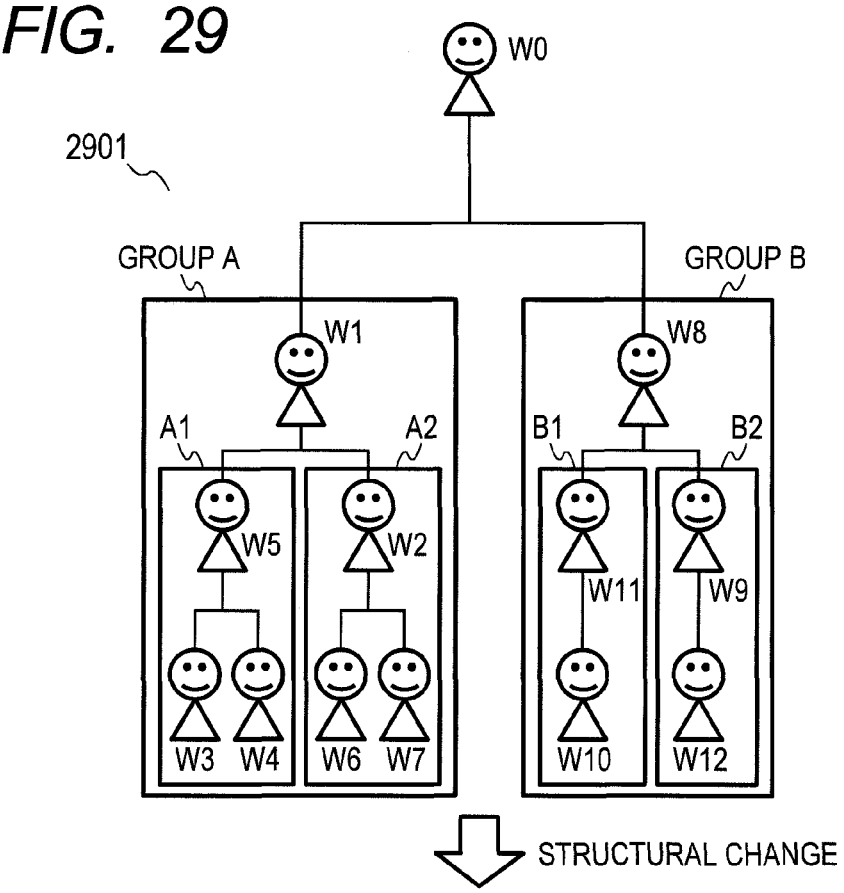
STRUCTURAL CHANGE
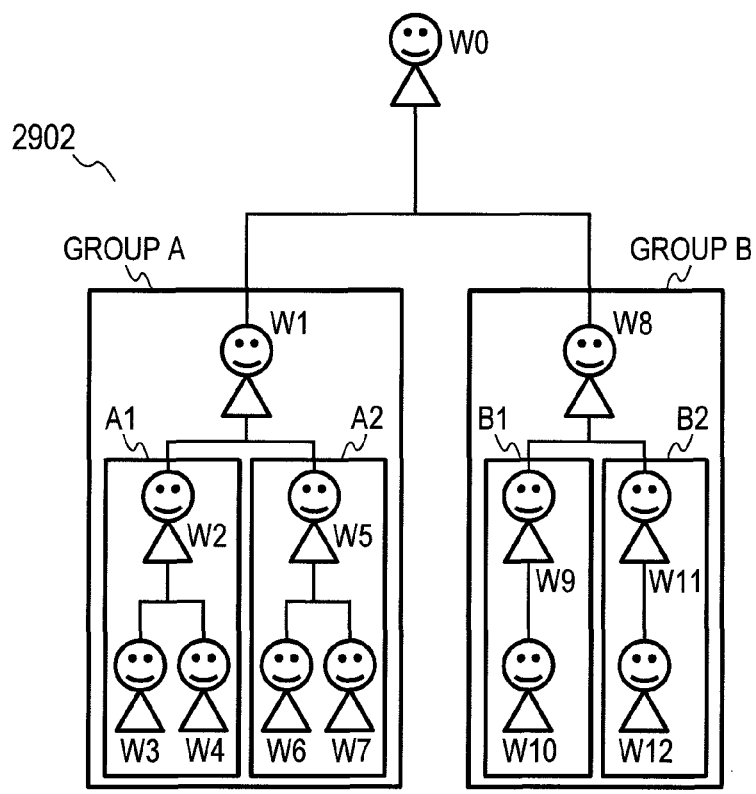

INFORMATION PROCESSING SYSTEM, MANAGEMENT SERVER AND INFORMATION PROCESSING METHOD

CLAIM OF PRIORITY

The present application claims priority from Japanese patent application JP 2011-180600 filed on Aug. 22, 2011, the content of which is hereby incorporated by reference into this application.

FIELD OF THE INVENTION

The present invention relates to technology for accumulating behavioral characteristics of people during face-to-face activities and individual activities by utilizing sensor devices and person-related information and estimating face-to-face information when different person-related information is provided.

BACKGROUND OF THE INVENTION

When assigning company personnel to internal organizations (hereafter including sections and groups) companies generally assign human talent (personnel) to groups where needed based on the same performance or skill conditions such as age, managerial posts, and qualifications in order to boost the productivity of the group.

A number of personnel placement support systems have been disclosed in the related art to assist in the process of placing company employees when assigning company employees or assigning company employees to specially designated work tasks as described above.

One such support system stores the performance information expressing the capabilities of company employees assigned beforehand with matching member ID, and when capability requirement information for the necessary matching job duties assigned to company employees from the section supplying the request information, the support system generates information showing the aptitude of company employee for the corresponding job duties using the stored capability information and capability requirement information, and assigns the company employee to the corresponding job based on this generated aptitude information (Japanese Unexamined Patent Application Publication No. 2002-109161).

On the other hand, advances in sensor technology in recent years have made measurement possible not only of static information such as age, managerial posts and qualifications, but also dynamic changes in communication in job tasks such as in Wakisaka, "Beam-Scan Sensor Node: Reliable Sensing Of Human Interactions In Organization", International Conference On Networked Sensing Systems, (US), Jun. 17, 2009. The ability to measure communications revealed that not only static information such as age, managerial posts and qualifications, but also communication within the group is deeply related to productivity. The literature by Lynn and others in, "Mining Face-to-Face Interaction Networks Using Sociometric Badges: Evidence Predicting Productivity in IT Configuration", International Conference on Information Systems (France), Dec. 14, 2008; discloses examples statistically analyzing the relation between the communication pattern and the time required from receiving the configuration request until completing the configuration, and for 900 job tasks within the office carried out through system configurations. Simple use of the communication time and number of persons as well as various communication patterns as markers or indices and then investigating their relationship to productivity revealed no relation between the simple communication time and number of persons and productivity but did show that the higher the index called cohesion, the higher the productivity.

SUMMARY OF THE INVENTION

In a group, the problem of how to allocate human talent (personnel) is the most critical issue and making decisions is also difficult. The foremost reason for this difficulty is that the performance a person exhibits in a certain environment is not determined by that person but by communication including the people around the person. This fact makes communication an extremely important factor in allocating human talent. Lynn and others, "Mining Face-to-Face Interaction Networks Using Sociometric Badges Evidence Predicting Productivity in IT Configuration", International Conference on Information Systems (France), Dec. 14, 2008 shows that cohesion which is one index of communication patterns around the individual correlates to the productivity of that person. In other words, the type of communication patterns used in the group where an employee has been assigned plays a large role in success or failure when allocating human talent. However, also clearly known is that communication patterns within a group do not develop merely through one's relation to the group structure and current technology is not capable of predicting this development.

The above circumstances show that estimating and providing group communication patterns after assigning an individual is a huge problem for providing personnel placement support.

A typical aspect of the present invention is given as follows. Namely, an information processing system comprised of terminals respectively attached to a plurality of persons that configure the group, a base station to communicate with the terminals, and the management server coupled by way of the network to the base station; in which each terminal includes a behavior information sensor to acquire behavioral information on the person wearing the terminal, and a transmit device to send the behavioral information to the base station; and the management server includes a network interface coupled to the network, a processor coupled to the network interface, and a storage device coupled to the processor; and further in which the storage device stores person-related information showing the pre-defined relations among the plurality of persons within the group, and the processor stores the behavioral information received by way of the network interface into the storage device, calculates the behavioral characteristic quantity of one or more types showing behavioral characteristics of each person relative to other persons based on the behavioral information, stores the calculated behavioral characteristic quantity in the storage device, sums the calculated behavioral characteristic quantities for each of the pre-defined relations between the person and the other persons (in the group), and further stores the summed behavioral characteristic quantities in the storage device, and when information showing changes in the predefined still non-implemented relation is acquired, and estimates the behavioral characteristic quantity of the person after the predefined relation was changed in accordance with the acquired information based on the behavioral characteristic quantity stored in the storage device, and outputs the estimated behavioral characteristic quantity.

One aspect of the present invention is capable of estimating in advance the communication quantity and overall structure between an optional two persons that will result after changing the organizational structure, and then displaying that quantity and structure to support the placement of personnel when changing the group structure.

BRIEF DESCRIPTION OF THE DRAWINGS

FIG. 4 is a drawing for describing the individual information table stored in the recording device of the embodiment of the present invention;

FIG. 6 is a drawing for describing the team (also called structural) relation index referred to in the embodiment of the present invention;

FIG. 11 is a drawing for describing the third face-to-face list of the embodiment of the present invention;

FIG. 12 is a drawing for describing the activity list of the embodiment of the present invention;

FIG. 13 is a drawing for describing the two-person face-to-face time list of the embodiment of the present invention;

FIG. 14 is a drawing for describing the transition pattern in the activity state in the embodiment of the present invention;

FIG. 15 is a drawing for describing the face-to-face time matrix in the embodiment of the present invention;

FIG. 16 is a drawing for describing the team (also called structural relation characteristics list of the embodiment of the present invention;

FIG. 17 is a drawing for describing the individual characteristics list of the embodiment of the present invention;

FIG. 29 is a drawing for describing the structural changes in the embodiment of the present invention.

DETAILED DESCRIPTION OF THE PREFERRED EMBODIMENTS

Figure 1:
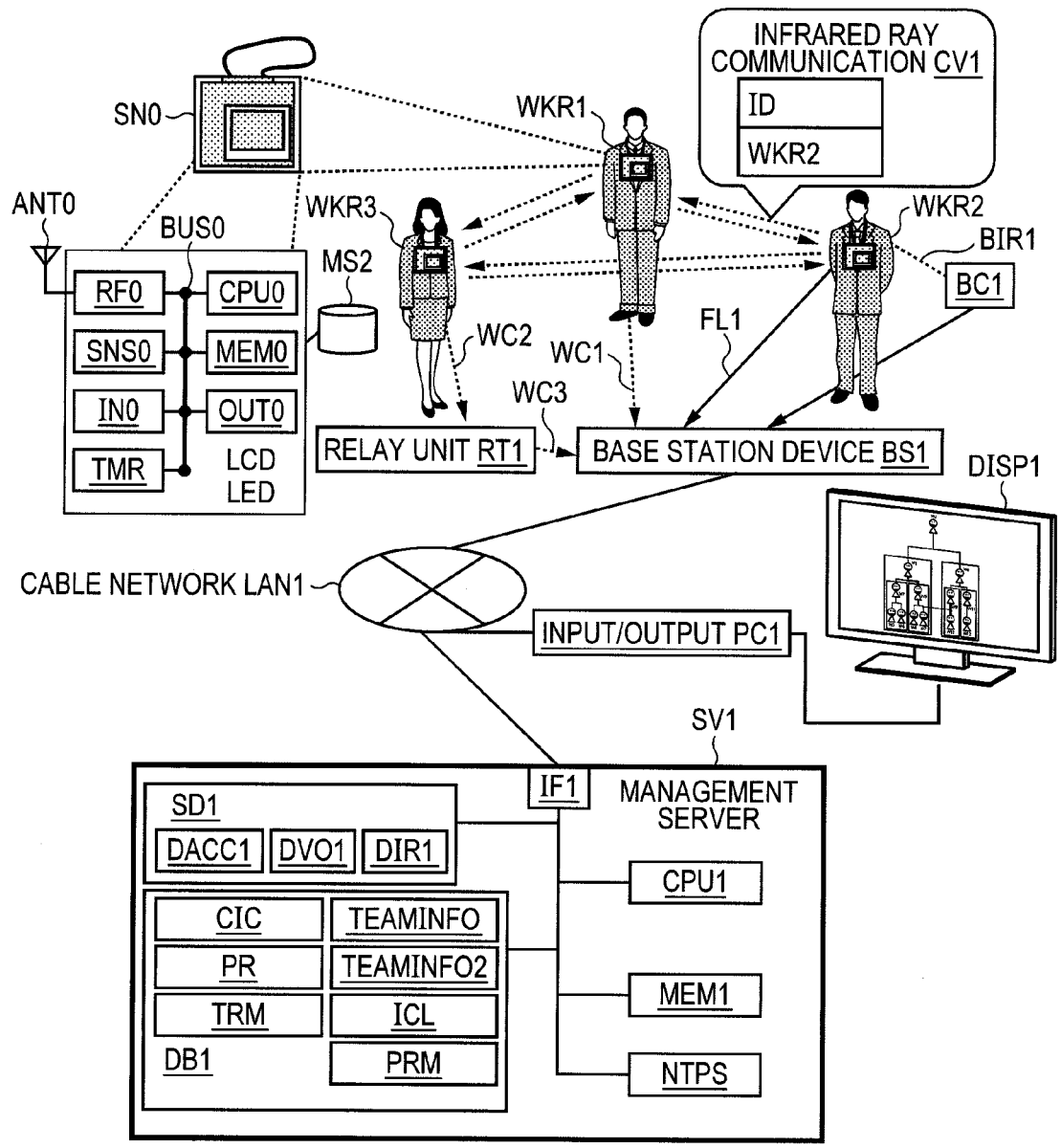
FIG. 1 is a block diagram showing the basic configuration of the sensor network system of the embodiment of the present invention.

The embodiments of the present invention are hereafter described in detail while referring to the drawings.
Structural Elements Assigned with the Same Reference Numerals Indicate an Identical or a Similar Structure.

FIG. 1 is a block diagram showing the basic configuration of the sensor network system of the embodiment of the present invention.

The worker WKR1 retains a sensor node SN0 mounted on a name tag or a wrist band. The sensor node SN0 is a sensor device comprised of a processor circuit CPU0, a wireless circuit RF0 coupled to an antenna ANT0, a sensor SNS0 such as for voice, acceleration, temperature, and infrared rays, a memory MEM0 to store a sensing program MS2, a button IN0, an output device OUT0 such as a LCD, LED, or buzzer, and a timer TMR to manage the time. The above structural elements are mutually connected by a bus BUS0.

The sending and receiving infrared signals by an infrared ray sensor allows detecting a human pulse when the sensor node SN0 is an arm or wrist band type sensor, and the directly opposite (oncoming) infrared ray device can be detected in the case of a name tag type sensor. In other words, infrared communication CV1 allows detecting mutual face-to-face communication when two persons such as a worker WKR1 and another worker WKR2 have met face-to-face and are both wearing name tag type sensor nodes SN0. Information sent by infrared communication CV1 may include at least an identifier (e.g. WKR2) assigned to the transmitting sensor node SN0. This identifier is uniformly assigned each of the sensor nodes SN0 and allows identifying the worker wearing the sensor node SN0. By mutually sending and receiving this type of information, the sensor network system can detect who a worker met faceto-face with and at what time. If still another worker WKR3 is wearing a sensor node SN0 as shown in FIG. 1, then face-to-face communication with the worker WKR1 and the worker WKR3, as well as face-to-face communication between the worker WKR2 and worker WKR3 can also be detected.

Information sensed by the sensor node SN0 is temporarily stored in the memory MEM0 and is then sent from the wireless circuit RF0 as a wireless communication WC1 or by way of a relay device RT1 as a wireless communication WC2 and WC3 to the base station device BS1. The sensed information may also be sent as a cable communication FL1 to the base station device BS1. The base station device BS1 retains a plurality of receiver units, and may simultaneously receive data from a plurality of sensor nodes.

A cable network LAN1 sends information received by the base station BS1 to the management server SV1 and this information is stored in the sensor database SD1 of the management server SV1. Programs described later on and generated lists are also stored in the management server SV1.

The computer PC1 utilized by the worker is coupled to the cable network LAN1 by way of a cable or a wireless LAN.

An infrared transmitter device BC1 is a device that periodically sends the infrared rays BIR1 and is installed in meeting places such as conference rooms, laboratories, or coffee break areas. The sensor node SN0 can detect the infrared rays BIR1 when a worker WKR1 wearing a name tag sensor device SN0 is working at the front of the infrared transmitter device BCI there. The work meeting places of each worker can in this way be known by sending this information by way of the wireless communication WC1.

The display DISP1 and the computer PC1 coupled to that display DISP1 can display results of processes executed by the management server SV1 to the user.

A NTP server NTPS for monitoring the time is stored within the management server SV1, and accurately monitors the time by methods such as referring periodically to standard times on the Internet, etc.

The management server SV1 is comprised of an interface IF1 coupled to a cable network LAN1, and a processor CPU1, a memory MEM1, a sensor database SD1, and a recording device DB1. The sensor database SD1 stores the sensing data acquired by each type of sensor. The recording device DB1 records each type of data table and each type of program described later on. The sensor database SD1 and the recording device DB1 are for example hard disk drives, CD-ROM drives or flash memories, etc. The sensor database SD1 and the recording device DB1 can also be configured as one recording device. The processor CPU1 executes each type of function by loading each type of program described later on that is stored in the recording device DB1 into the memory MEM1.

In the example in FIG. 1, the recording device DB1 includes: a collect individual characteristics process CIC, a projected relation estimate process PR, an individual information table TEAMINFO, an estimated individual information table TEAMINFO2, a team relation matrix TRM, an individual characteristic list ICL, and a projected relation estimated characteristics matrix PRM. These items are programs executed by the processor CPU1, or data created or searched by these programs. These items are described in detail later on.

Figure 2:
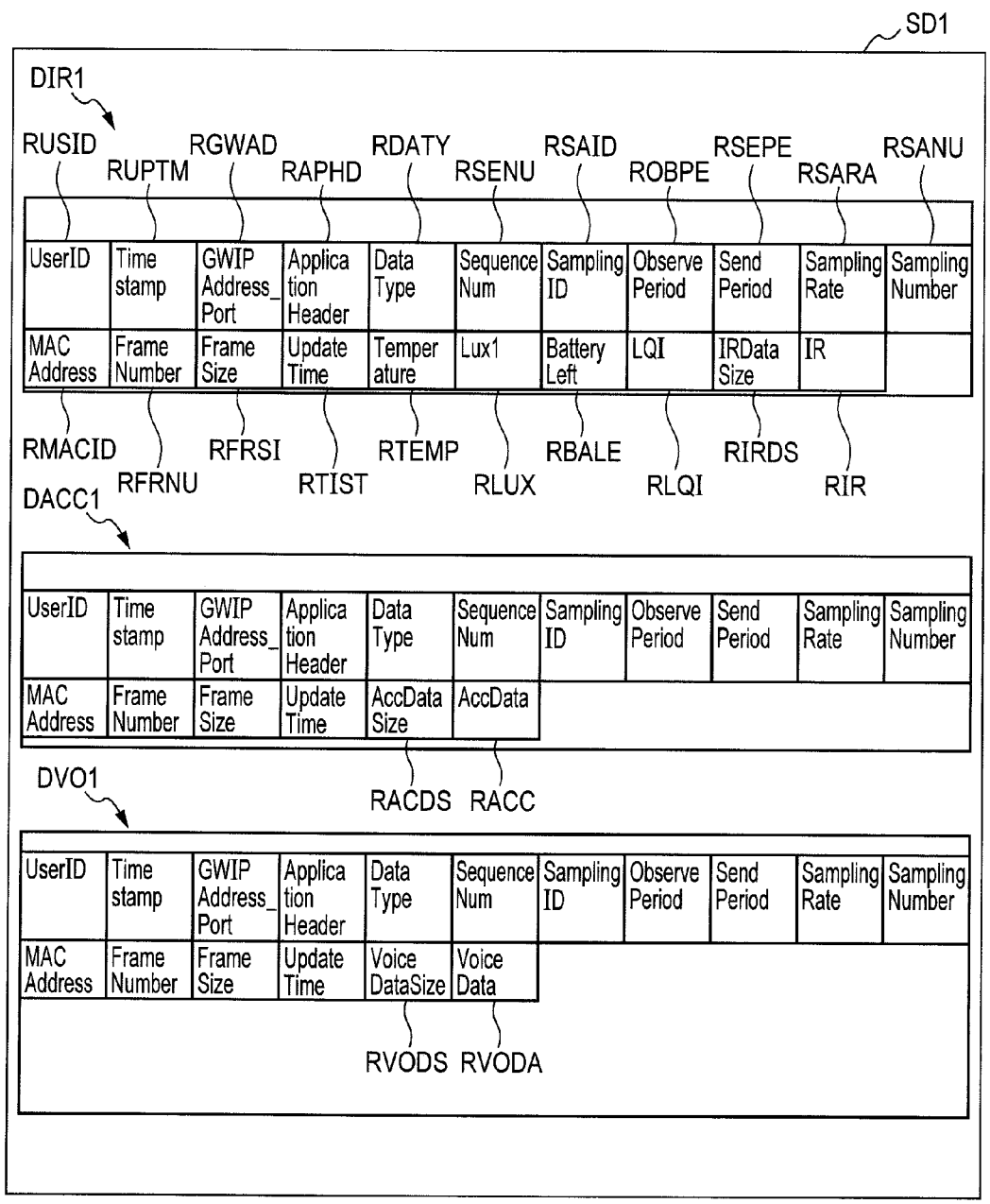
FIG. 2 is a drawing for describing an example of the data and the structure of the database for sensor data stored in the management server of the embodiment of the present invention.

FIG. 2 is a drawing showing an example of the data and the structure of the database SD1 for sensor data stored in the management server SV1 of the embodiment of the present invention.

The database SD1 manages the corresponding matches between the sensor data, identification information for the sensor device utilized by the worker, and the worker's identification information, etc.

The database SD1 includes a table DIRT, a table DACC1 and a table DVO1.

The table DIR1 is a table that matches and stores the temperature data, illuminance data, and infrared ray detection data.

The identification ID of the user (namely, the worker wearing the sensor node SN0 including the sensor device) utilizing this sensor device is stored in row RUSID.

The time when the data is stored in the database SD1 is stored in row RUPTM.

The identifier for the base station device (for example BS1) that received the data by wireless (radio) is stored in the row RGWAD.

The row RAPHD stores values showing the type of sensor device. The row RAPHD for example stores a value 1 for a wrist band device and a value 2 for a name tag device.

The row RDATY stores values showing the type of data stored in the wireless packet. When data including a set of data such as temperature data, illuminance data, and infrared ray detection data is stored in a wireless packet, then the row RDATY for example stores a value 1, stores a value 2 in the case of acceleration data, and stores a value 3 in the case of voice, data, etc.

The row RSENU is a cyclic counter assigned with values from 0000 to FFFF in the frame transmission sequence of the sensor device and this counter resets to 0000 after reaching FFFF. If the sub-frames (namely, plural frames containing data sampled in the same sensing period) are linked, then the sequence number of the first frame is stored.

The row RSAID stores a sampling identifier for identifying the timing at which the data is sampled. The same sampling identifier is assigned to sub-frames containing data sampled in the same sensing period.

The row RROBPE stores the current sensing interval of the sensor device.

The row RSEPE stores the current wireless transmission interval of the sensor device. A numerical value showing the wireless transmission interval may be stored, and a value may be stored showing a multiple of the sensing interval in the wireless transmission interval.

The row RSARA stores the sensor data acquisition cycle of the sensor device. For example if sensing is performed for one second in every ten seconds, and the sampling frequency of the sensor is 50 Hz in that one second period, then "50 HZ" is stored in row RSARA and "10 seconds" is stored in the row ROBPE.

The row RSANU stores the current sampling count of the sensor node.

The row RMACID stores the network address (e.g. MAC address) of the device. The row RMACID in this way links the ID (row RMACID) of the sensor node SN0 to the ID (row RUSID) of the worker wearing that sensor node.

The row RFRNU stores a value showing the sequence of each frame when the frame has been subdivided. If there is a total of N sub-frames then N, N−1, N−2, - - - 3, 2, 1 and the descending No. sequence are assigned to each frame. A 1 indicates the final sub-frame, and a 0 indicates the 256th frame.

The row RFRSI stores the total number of serial frames sent as sub-frames.

The row RTIST stores the sensor device time when the main data was acquired by the sensor.

The row RTEMP stores the temperature data acquired by the sensor device.

The row RLUX stores the illuminance data acquired by the sensor device.

The row RBALE stores values showing the remaining battery level of the sensor device that is for example a power supply voltage.

The row RLQI stores a value such as LQI (LINKQUALITYINDICATOR) showing the wireless communication quality between the sensor device and the base station.

The row RIRDS stores a detection count of the infrared data contained within this data.

The row RIR stores the infrared data acquired by the sensor device.

The table DACC1 stores acceleration sensor data instead of data such as the infrared rays of table DIR. The table DACC1 stores the same contents as table DIR from row RMACID to row RTIST.

The row RACDS stores a detection count of the acceleration data contained within this data.

The row RACC stores acceleration data acquired by the sensor device.

The table DVO1 stores audio data instead of data such as infrared rays in the table DIR. The table DVO1 stores the same contents as the table DIR from row RMACID to row RTIST.

The row RVODS stores the detection count for audio data contained within this data.

The row RVODA stores audio data acquired by the sensor device.

The individual information table TEAMINFO is described next.

The structure of the group (or organization) utilized as an example is described first in the following description.

Figure 3:
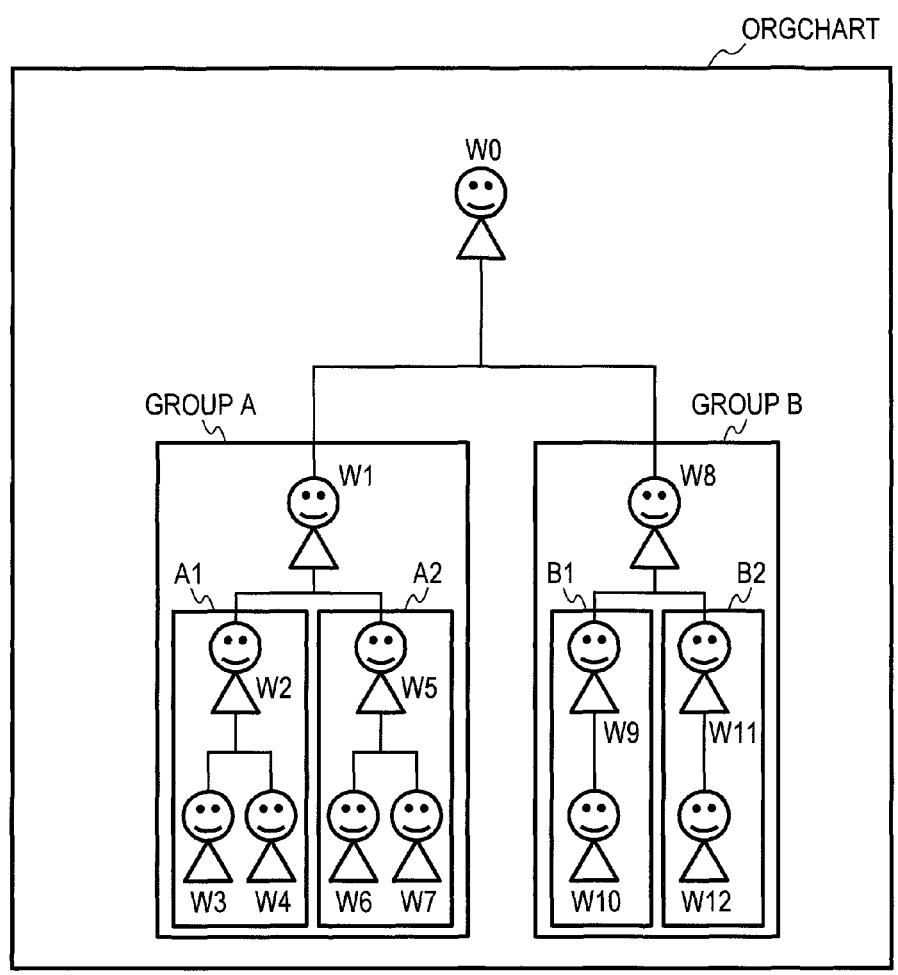
FIG. 3 is a drawing for describing the structure of the group utilized as an example in the embodiment of the present invention.

FIG. 3 is a drawing for describing the structure of the group (or organization) utilized as an example in the embodiment of the present invention.

The organizational chart ORGCHART shown in FIG. 3 shows the structure of the organization of 13 people from the workers W0 to W12. This organization includes a GROUP A comprised of workers W1 through W7, and a GROUP B comprised of workers W8 through W12. The worker W0 is the overall organization leader including group A and group B. Each group may also include further smaller groups (called teams in this embodiment). In the example in FIG. 3 each group includes one or more teams. In the example in FIG. 3, the group A includes a team A1 comprised of workers W2 through W4, and a team A2 comprised of workers W5 through W7. The leaders of team A1 and A2 are respectively the workers W2 and W5. The group B includes a team B1 comprised of the workers W9 and W10, and a team B2 comprised of workers W11 and W12. The leaders of the teams B1 and B2 are respectively the workers W9 and W11.

FIG. 4 is a drawing for describing the individual information table TEAMINFO stored in the recording device DB1 (FIG. 1) of the embodiment of the present invention.

Item such as each worker's assigned section or post, job rank and structural relation are stored in the individual information TEAMINFO while linked to the identification ID of each worker. Information on these workers is input beforehand by a data viewer from the display device DISP1 and stored in the recording device DB1. In the data in the example in FIG. 4, the organizational data is stored in a configuration as shown in the organization diagram ORGCHART in FIG. 3.

The following data is for example stored in the individual information table TEAMINFO shown in FIG. 4. The row USERID stores the worker identification ID used for that sensor node. The row UNAME stores the name of the worker. The row GROUPID stores the ID identifying the group to which the worker belongs. A NULL is stored for workers not belonging to any group. A flag showing the group leader is stored in the row GLEADER. Here, a 1 for example is stored for a group leader and in all other cases a 0 is stored. An ID identifying the team to which the worker belongs is stored in the row TEAMID. A NULL is stored for workers not belonging to any team. A flag showing the team leader is stored in the row TLEADER. Here, a 1 for example is stored for a team leader and in all other cases a 0 is stored. Information showing the job rank is stored in the row POSID. For example, a 1 is stored for managers, a 2 is stored for chiefs (sub-managers), and a 3 is stored for new employees. An identifying ID for the worker's boss is stored in the row SUPERIORID. A NULL is stored for workers who have no boss or superior. An identifying ID for worker's subordinate is stored in the row FOLLOWERID. A NULL is stored for workers who have no subordinate. Every time these individual information tables are rewritten or refreshed, information on the new and prior date is stored and can be corrected while referring to an optional date table.

This individual information table TEAMINFO shows clear examples of related organizational information such as for a company, including the group a person belongs to and that person's job rank hierarchy in the organization. However if applying the present invention to organizations where the group or hierarchy is not clearly specified such as clubs then just storing information showing the group that each worker belongs to may be stored in the individual information table TEAMINFO.

Figure 5:
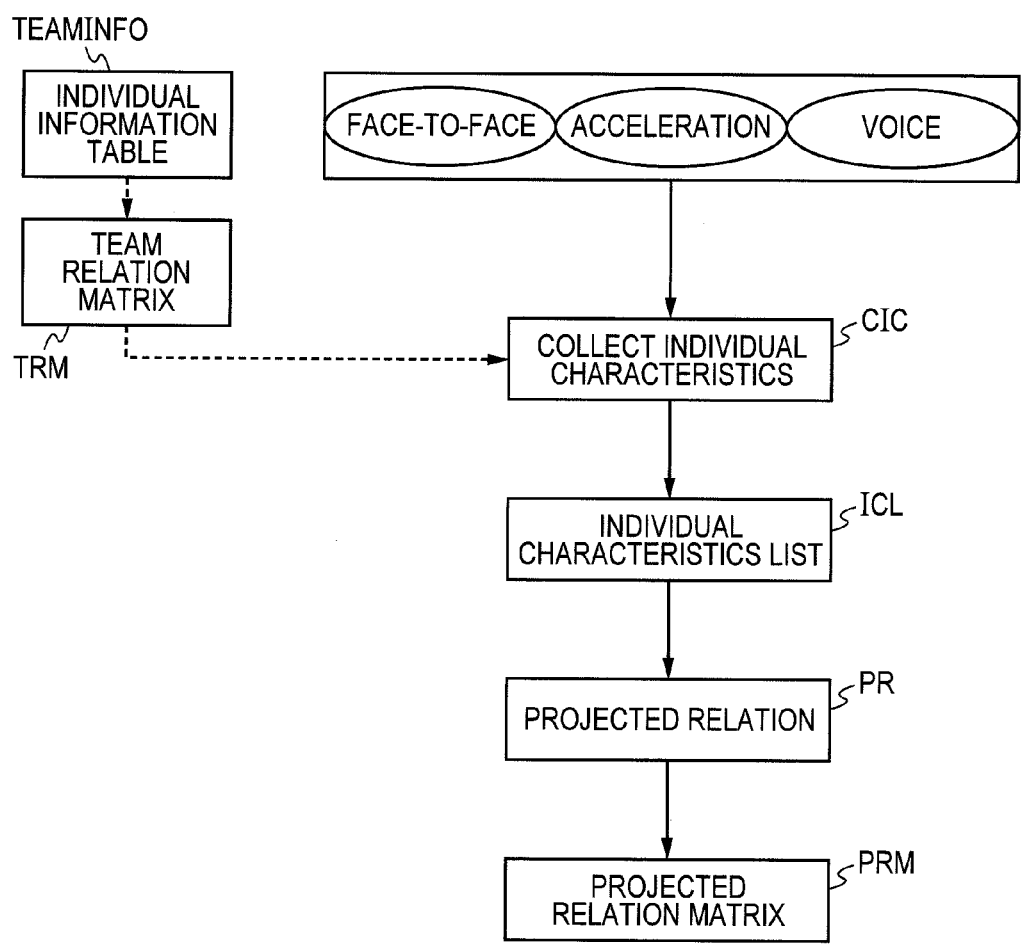
FIG. 5 is a flowchart showing the analysis and clarification procedures implemented by the management server of the embodiment of the present invention.

FIG. 5 is a flowchart showing the analysis and clarification procedures implemented by the management server SV1 of the embodiment of the present invention.

The individual information TEAMINFO has here been converted to a team relational matrix TRM showing the structural relation between two optional selected persons. Processing (collect individual characteristics process CIC) to analyze the related characteristic quantities of the individual is then implemented along with face-to-face data, acceleration data, and audio data acquired by using this team relational matrix TRM and the sensor data. The related characteristic quantity used here indicates the individual person's average communication trends such as to what extent an individual communicates with his boss, and also to what extent the individual actively engages in conversation during that communication.

Specific related characteristic quantities and methods for finding them are described later. These relation characteristics quantities are known to strongly reflect how an individual associates with other persons. Quantitatively determining these related characteristic quantities allows estimating beforehand what type of relation will be established at times such as when a team member has been transferred for example for personnel placement or when the members are the same but their mutual relation has change (for example when a colleague has become a boss). When one wants to estimate what type of relation or structural relation will be established among members, that structural relation is first input, and based on that input structural relation, and the individual characteristics list ICL storing that required related characteristic quantity, an a projected relation estimate process PR is executed to create the estimated relation characteristics quantity list (or projected relation characteristic matrix PRM). Each step is described next in detail.

Figure 7:
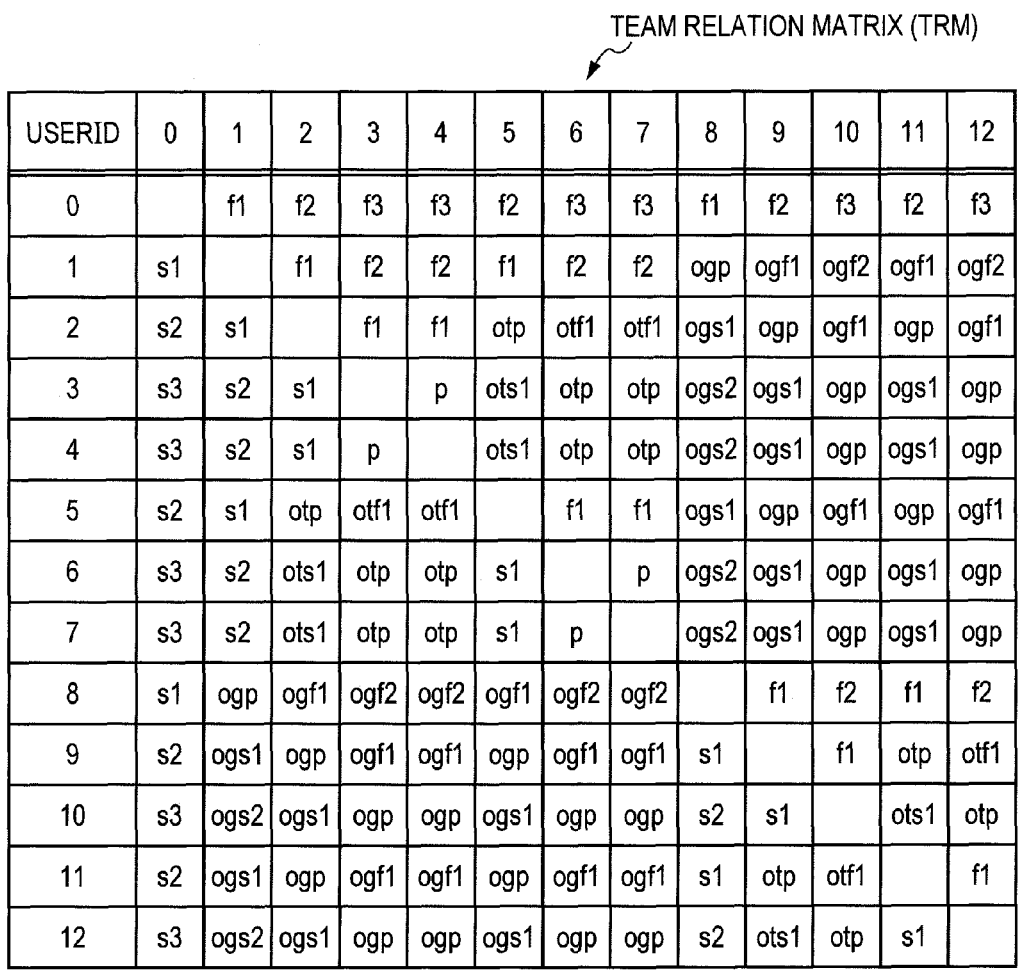
FIG. 7 is a drawing for describing the team (also called structural) relation matrix created by the management server of the embodiment of the present invention.

First of all, the step for converting the individual information table TEAMINFO into a team relation matrix TRM is described while referring to FIG. 6 and FIG. 7.

FIG. 6 is a drawing for describing the team relation index TRI referred to in the embodiment of the present invention.

FIG. 7 is a drawing for describing the team relation matrix TRM created by the management server SV1 of the embodiment of the present invention.

The team relation matrix TRM shown in FIG. 7 stores the team relation index TRI among optional two persons extracted from individual information contained in the individual information table TEAMINFO. The team relation index TRI just as shown in FIG. 6 is utilized to show information from the organization diagram shown in FIG. 3, as relational information showing the relation between two persons. Data stored here defines the relation between the two persons on 2 axes, the hierarchical information indicated by the vertical positional relation and group information indicated by the lateral positional relation in the organizational diagram in FIG. 3.

Hierarchical information is broadly grouped into bosses "s", same level "p", and subordinates "f"; and further finely grouped by the closeness of those relations. In other words, the system relational index for describing the relation between that worker and another worker on the same level is "p" as seen from that worker's viewpoint. In the same way, the relation between that worker and a boss one rank higher than that worker; the relation between that worker and a boss n ranks higher than that worker; and the relation between that worker and a subordinate one rank lower; as well as the relation between that worker and a subordinate n rank lower are respectively described in the team relation matrix TRM as, "s1", "sn", "f1" and "fn".

In FIG. 3 for example, a worker W3 is a direct subordinate as seen from the worker W3 so that the team relation index TRI shows the relation between the worker W2 and the worker W3 as seen from the viewpoint of worker W2 as "f1". On the other hand, W0 is a boss two ranks higher as seen by worker W2 so that the team relation index TRI shows the relation between the worker W2 and the worker W0 as seen by worker W2 as "s2".

In the team relation matrix TRM (FIG. 7), the team relation index TRI that describes the relation of each worker as seen from the viewpoint of a worker identified by the user identifier (USERID) on the vertical axis, is stored in the row corresponding to each user identifier on the horizontal axis for the line corresponding to that user identifier. As one example of this arrangement, the user identifiers for workers W0 through W12 are respectively "0" through "12". In other words, "f1" showing the relation between the above worker W2 and worker W3 is stored in the row corresponding to the user identifier "3" on the horizontal axis, of the line corresponding to the user identifier "2" on the vertical axis; and the structural relation index "s2" showing the relation between the worker W2 and worker W0 is stored in the row corresponding to the user identifier "0" on the horizontal axis, of the line corresponding to the user identifier "2" on the vertical axis.

In one example, a team relation index TRI can be added as modifier information showing whether two workers belong to the same company group, belong to another team in the same group or belong to another group. In the examples in FIG. 6 and FIG. 7, if the two workers belong to the same company group, then no modifier information is added, if the two workers belong to another team in the same group then the modifier information "ot" is added, and if the two workers belong to another group then the modifier information "og" is added.

The worker W2 for example is seen as a direct boss in the same group, from the viewpoint of worker W3 in FIG. 3 so the team (structural) relation index TRI showing the relation between the worker W2 and worker W3 is "s1" as viewed by the worker W3. This "s1" is stored in the row corresponding to the user identifier "2" on the horizontal axis, of the line corresponding to the user identifier "3" on the vertical axis (FIG. 7). The worker 5 is a boss one rank higher in another team of the same group as seen by the worker W3 so the team (structural) relation index TRI showing the relation between the worker W3 and worker W5 as seen from the viewpoint of the worker W3 is "ots1". This "ots1" is stored in the row corresponding to the user identifier "5" on the horizontal axis, for the line corresponding to the user identifier "3" on the vertical axis (FIG. 7). The worker W9 and the worker W11 are bosses one rank higher of another group as seen by the worker W3, so that the team relation index TRI showing the relation of the worker W3 and worker W9 as well as the relation of the worker W3 and worker W11 as seen by the worker W3 are "ogs1" in either case. This "ogs1" is stored in the row corresponding to the user identifier "9" on the horizontal axis, for the line corresponding to the user identifier "3" on the vertical axis; and the row corresponding to the user identifier "11" on the horizontal axis (FIG. 7).

Here, if for example the boss one rank higher on a rank between the boss on the second higher rank and the worker identified by the user identifier is no longer present, then the team relation index TRI for the boss on the second higher rank is set to F2. The matrix showing this system among an optional two people in this way is the team relation matrix TRM of FIG. 7.

As can be seen above, the team relation matrix TRM stores information showing clearly predefined, clearly changing relations (namely structural relations) rather than relations among people belonging to an organization (sections and groups) and particularly relations established by actual individual behavior, that change according to one's actions. In an organization such as a company for example, the group that a person belongs to and each person's job rank within that hierarchy is clear, so information showing relations such as for those hierarchies and group (more specifically, information showing relation such as the group each person belongs to, information showing the relation in terms of each person's position within the chain of command, and information showing the relation of each person with the job rank hierarchy, etc.) is stored within the team relation matrix TRM. Examples of that individual relation information are shown in FIG. 7.

The present embodiment utilizes a company where the group and hierarchy are clearly defined as an example of structural relations. However all of the elements of the above matrix may be applied as the same structural index for example for organizations such as clubs or associations where there are no particular established groups and hierarchies. Moreover if there is no data in the individual information table TEAMINFO then the same structural index may be utilized in the same way for all of the elements in this team relation matrix TRM. The labeling for finding the relation characteristic quantity between two people by using this team relation matrix TRM is described later.

The collect individual characteristics (also called individual characteristic quantity extraction process) CIC of FIG. 6 is described next.

Figure 8:
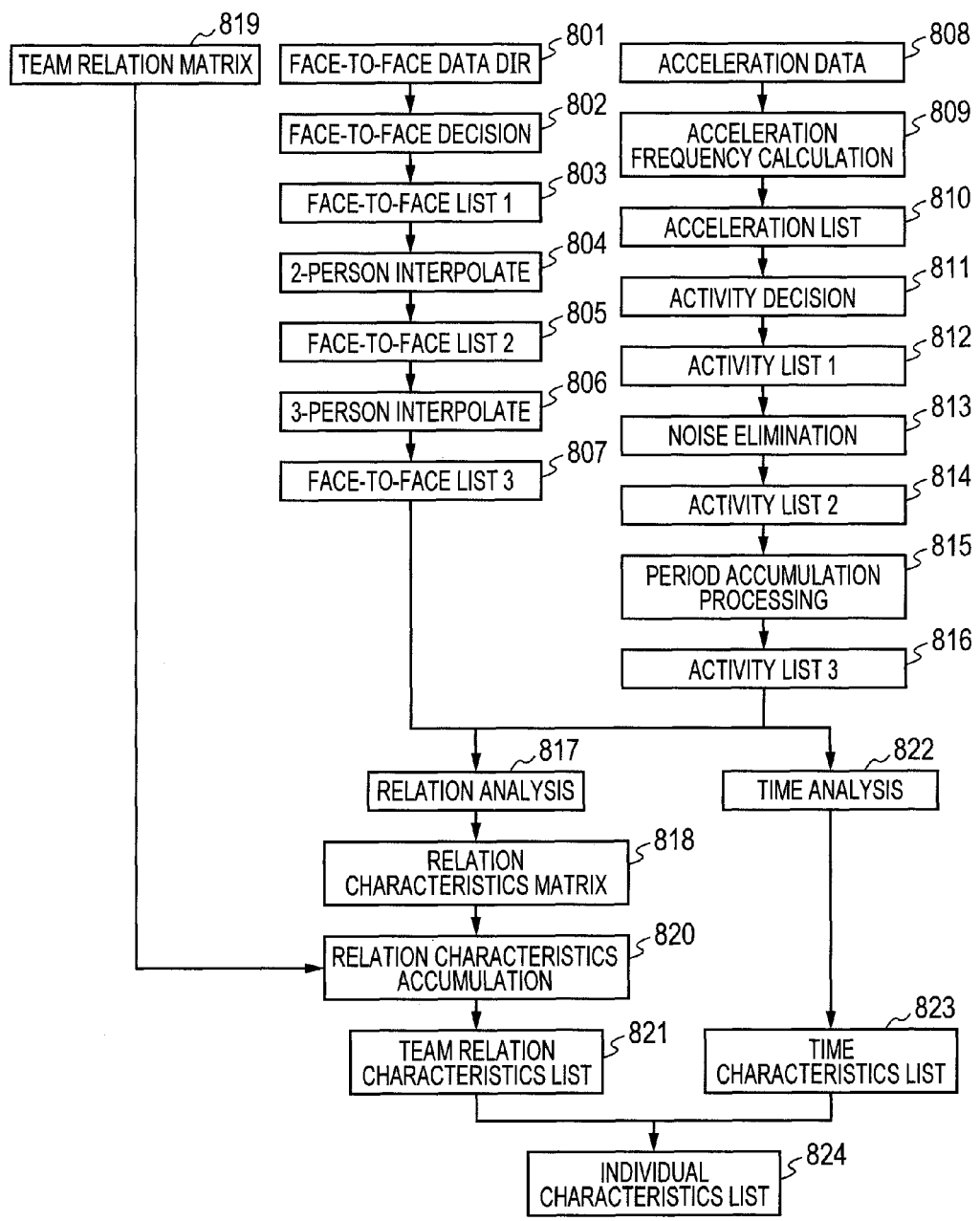
FIG. 8 is a flowchart of the collect individual characteristic process implemented by the management server of the embodiment of the present invention.

FIG. 8 is a flowchart of the collect individual characteristics CIC implemented by the management server SV1 of the embodiment of the present invention.

Figure 9:
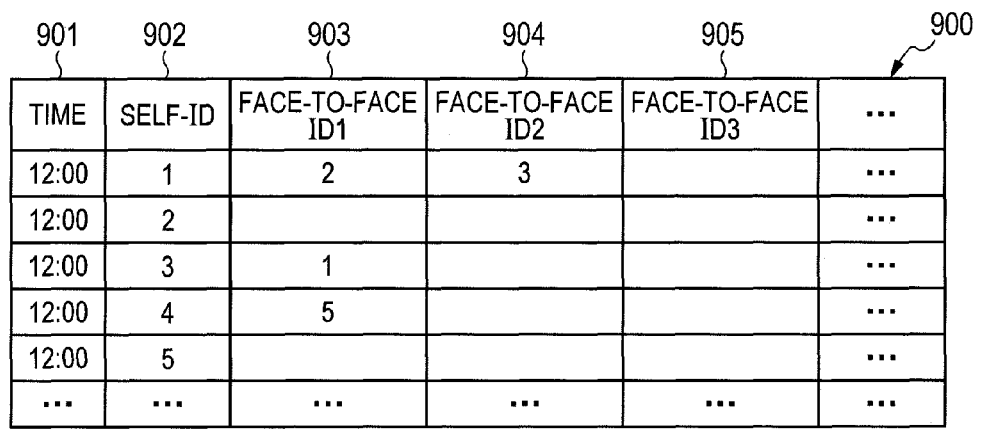
FIG. 9 is a drawing for describing the first face-to-face list of the embodiment of the present invention.

First of all, the management server SV1 loads the face-to-face data DIR (step 801), and makes a face-to-face judgment (step 802) to generate a face-to-face list 1 as shown in FIG. 9 (step 803).

The face-to-face list 1_900 shown in FIG. 9 includes a time 901, a self-ID 902, face-to-face ID1_903, face-to-face ID2_904, and a face-to-face ID3_905.

The time 901 stores for example the time that the infrared sensor for the name tag sensor node SN0 detected a face-to-face meeting between workers.

The self-ID 902 stores the ID of the receiver or namely the identifier (ID) of the worker wearing the sensor node SN0 including the infrared sensor that detected the face-to-face meeting.

The face-to-face ID1_903 stores the ID of the transmitter or in other words, the ID of the other worker in the face-to-face meeting detected by the infrared sensor.

If a face-to-face meeting with a plurality of workers was detected at the same time, then the ID of those other workers in the face-to-face meetings are sequentially stored in the face-to-face ID1_903, face-to-face ID2_904, and a face-to-face ID3_905. If each worker might possibly have a face-to-face meeting with four or more workers then further rows may be provided to store face-to-face ID such as a face-to-face ID4 (not shown in drawings).

In the example in FIG. 9, a "2" and a "3" are respectively stored in the face-to-face ID1_903 and the face-to-face ID2_904 for the time "12:00" and the corresponding self-ID "1". These items indicate the worker identified by the ID "1" (hereafter, also written as worker "1" and the same for other ID) had the face-to-face meeting with the workers "2" and "3" at the time 12:00. These face-to-face is for example detected by the infrared sensor of the sensor node SN0 worn by the worker "1" receiving the infrared signal from the sensor node SN0 worn by the worker "3" and the infrared sensor node SN0 worn by the worker "2".

Next, the management server SV1 performs 2-person interpolate for the face-to-face list 1 (step 804), and makes a face-to-face list 2 (step 805).

Figure 10:
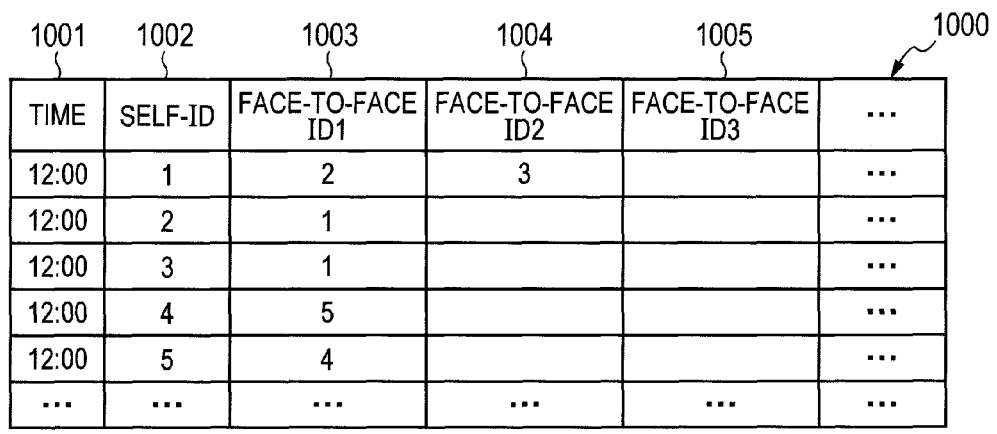
FIG. 10 is a drawing for describing the second face-to-face list of the embodiment of the present invention.

This 2-person interpolate is described here. When the workers I and J for example are meeting face-to-face, the sensor node SN0 worn by I is receiving the infrared signal from the sensor node SN0 worn by J, however in some cases the sensor node SN0 worn by J might not be capable of receiving the infrared signal from the sensor node SN0 worn by I. In such cases data interpolation is performed. More specifically, the management server SV1 loads the face-to-face list 1, and copies the record of when the receiver J received the infrared signal sent at a certain time from the transmitter I, into a face-to-face list 2. Moreover, when there is no record of when the receiver I received the infrared signal sent from the transmitter J at that same time, then that information is added to the face-to-face list 2. FIG. 10 shows a face-to-face list 2 made in this way.

The face-to-face list2_1000 in FIG. 10 includes rows such as the time 1001, self-ID1002, face-to-face ID1_1003, face-to-face ID2_1004 and face-to-face ID3_1005. Each of these items corresponds to the time 901, self-ID902, face-to-faceID1_903, face-to-faceID2_904 and face-to-face ID3_905 and so on in FIG. 9.

The example in FIG. 9 shows that at "12:00", the worker "1" received an infrared signal from the worker "2" but that the worker "2" is not receiving an infrared signal from the worker "1". In this case, due to some type of problem, the sensor node SN0 of the worker "2" failed to receive the infrared signal from the sensor node SN0 of the worker "1" even though the worker "1" was meeting face-to-face with the worker "2". The management server SV1 therefore adds the time "12:00" of face-to-face list2_1000 and a "1" to the face-to-face ID1_1003 corresponding to the self-ID "2".

Likewise, if meeting three persons face-to-face, then sending and receiving infrared rays between all pairs might prove impossible among three people simultaneously meeting face-to-face. The management server SV1 therefore interpolates the face-to-face list 2_1000 data (step 806). More specifically, the management server SV1 loads the face-to-face list 2_1000, and copies that list to the face-to-face list 3_1100. Further, when there is no record of the transmitter K receiving the ID of the receiver L at a certain time, even though there are records of a receiver (receiving party) receiving the ID of the plural transmitters K and L at that same time, then that information is added to the face-to-face list 3 (step 807). The face-to-face list 3 made in this way is shown in FIG. 11.

The face-to-face list 3 in FIG. 11 includes rows such as a time 1101, a self-ID 1102, a face-to-face ID1_1103, a face-to-face ID2_1104, and a face-to-face ID3_1105. These items respectively correspond to the time 1001, self-ID1002, face-to-face ID1_1003, face-to-face ID2_1004 and face-to-face ID3_1005.

The example in FIG. 10 shows that the worker "1" received infrared signals from the worker "2" and worker "3" at the time "12:00", however the worker "2" did not receive an infrared signal from the worker "3", and that the worker "3" did not receive infrared signals from the worker "2". In this case, even though the worker "1", worker "2", and worker "3" actually met face-to-face, the sensor node SN0 of the worker "2" failed to receive an infrared signal from the sensor node SN0 of worker "3" due to some reason. Likewise, the sensor node SN0 of the worker "3" failed to receive an infrared signal from the sensor node SN0 of the worker "2". The management server SV1 therefore respectively adds the time "12:00" of face-to-face list 3_1100 and a "3" to the face-to-face ID2_1104 corresponding to the self-ID "2"; and adds the time "12:00" and a "2" to the face-to-face ID2_1104 corresponding to the self-ID "3".

When making a face-to-face list, rather than simply face-to-face meetings, the system can also judge just those face-to-face meetings where some type of information was exchanged. This judgment utilizes just those extracted face-face meetings signifying the cases of sending information such as "speak" and receiving information such as "agree" as meaningful face-to-face meetings. The management server SV1 in this case loads the face-to-face list 3_1100, and loads the acceleration information of the sender and receiver for the same time that registration in the face-to-face list 3_1100 took place from the acceleration data DACC. Then, if the size of the sender and receiver acceleration signals and the frequency of the acceleration are lower than a pre-established threshold, the management server SV1 judges that only a face-to-face meeting occurred between both parties with no important exchange of information, and deletes the ID of the applicable sender and receiver at the applicable time from the face-to-face list 3.

In FIG. 11 for example, one might perceive that three persons, workers "1", "2", and "3" were face-to-face at 12:00. However, if the size of the acceleration signal and the acceleration frequency for these workers was at or below the threshold then the management server SV1 estimates that these three persons were merely at the same place, and that no meaningful conference was held and this face-to-face data may be deleted from the face-to-face list3. However, the user can select whether or not to delete this information.

The management server SV1 next calculates the degree of activity by the following method from the values of the acceleration data RACC and the detection count RACDS for acceleration data in the table DACC1 that stores the acceleration information and the management server SV1 then stores those results in an activity list (described later).

The technique for deciding whether each worker is in an activity state or not, is described next. Taking positive action at work allows gathering information from within and outside the organization and promotes the forming of ideal through energetic discussion. Some actions assumed in such cases might include, "face-to-face meetings including gestures as well as words" and "face-to-face meetings by heading toward the location where the other party is present". The present inventors carried out experiments relating to the activity and action (or movement) rhythm of such users and the consequent results such as from video data, and discovered that compared to other time bands, the time band for active work has a high acceleration frequency. During a conversation for example, the frequency component rises from 2 Hz to 3 Hz. So here we judge the time band where the acceleration frequency exceeds a specified (or certain) threshold value as the activity state. A typical acceleration frequency is 2 HZ or higher. This value of course varies with the individual or type of job and so the value can be changed to match the circumstances.

Referring again to FIG. 8, the flow for calculating the degree of activity is described here. The initial acceleration frequency calculation 809 is a process for finding the frequency from the acceleration data 808 arrayed along a time series. The frequency is defined as the number of wave oscillations for one second or in other words is an index expressing the intensity of the oscillations. The frequency can be calculated using Fourier transforms but in the present embodiment the zero-cross value equivalent (or corresponding) to the frequency is utilized in order to simplify the calculation. Utilizing this type of value lowers the server processing load and is also effective in handling higher server calculation load caused by increasing the number of sensor nodes.

The zero-cross value is the number of times that a value of the time series data reaches zero (or zero cross-point) within a fixed period or more accurately is a count of the number of times the time series data changed from a positive value to a negative value, or from a negative value to a positive value. For example, if the period in which the acceleration value changes from positive to negative, until the next time that value changes from positive to negative is set as one cycle, then the number of oscillations per one second can be calculated from the summed zero-cross count. The oscillation count per one second calculated in this way can be utilized as the approximate acceleration frequency.

The sensor node SN0 of the present embodiment contains a three-axis acceleration sensor so one zero-cross value can be calculated by totaling the zero-cross values along three axes within the same period. The sensor node can in this way detect the fine pendulum movement in particular along the front-back and the left-right directions, which can be utilized as an index expressing the intensity of the oscillation.

A value larger than the consecutive data interval (namely, the original sensing interval) may be set as the "fixed period" for counting the zero-cross value. The zero-cross value for example can be found per second or a zero-cross value can be found per minute.

Results from the acceleration frequency calculation 809, zero-cross values for each time, and the number of oscillations in seconds calculated from that value are generated in the memory as the acceleration list 810 or generated as a file.

The management server SV1 next executes activity decision 811 on this acceleration list 810. As already described above, whether or not the worker is in the activity state in each time band is judged based on whether the frequency of the acceleration measured by the sensor node SN0 worn by that worker has exceeded a certain threshold value or not. More specifically, the management server SV1 scans the acceleration list 810 along the time sequence, and inserts a "1" in the judgment value as the activity state on the line where the acceleration frequency exceeded the threshold value, and inserts a "0" in the judgment value as a non-activity state on the line where below the threshold value. An activity list 1_812 is consequently generated that includes results judged in seconds on whether or not the worker is in the activity state in each time period.

Here, there are occasions when even if the acceleration frequency in a short time band is below the threshold value, the acceleration frequency in the prior and subsequent time bands is above the threshold value (namely, the activity state); conversely there are occasions when even if the acceleration frequency in a short time band is above the threshold value, the acceleration frequency in the prior and subsequent time bands is below the threshold value (namely, the non-activity state). Some mechanism is required to remove this type of momentary noise.

Whereupon the management server SV1 next executes the noise elimination 813 on the activity list 1_812. The role of noise elimination for example in the time series "0001000111111001111" occurring due to time series fluctuations in the activity level found above, is to generate the time series with momentary fluctuations removed by applying the before and after relation, for example the following "0000000111111111111" time series. Applying this type of noise elimination allows calculating an activity level that takes the before and after relation on the time band into account to obtain an activity level that more accurately reflects the actual circumstances.

The process for removing noise can be implemented by using a low-pass filter to remove high-frequency components. However, a simpler method called the majority decision method is utilized here. In this method, each time band from the beginning to the end of the time series sequence is selected as one segment for judgment. Currently, the Ith time band of activity list 1_812 is the target for judgment processing. The management server SV1 here counts the number of activity state time bands, and the number of non-activity (or inactive) state time bands relative to a total 2N+1 time band from the I−Nth time band to the I+Nth time band. Here, if the number of activity state time bands is larger and the Ith time band is not an activity state, then the management server SV1 changes the Ith state to an activity state. Conversely, if the number of non-activity state time bands is larger, then the management server SV1 changes the Ith state to a non-activity state.

Applying this method for example as N=2 to the "0001000111111001111" time series, generates the "0000000111111111111" time series. If the N is small, then only short time states before and after each time band is reflected and the noise are removed; and if the N is large then a longer time state is reflected and the noise is removed.

Though the size of N depends on the person and the type of work, a small N can be utilized to first remove short noise and then a large N again utilized to remove somewhat longer noise. Implementing the majority decision method in this way reduces the amount of server calculations, and lowers the processing load. Consequently, an activity list 2_814 is generated that contains results judging in seconds whether or not a worker is in the activity state in each time band.

This activity list 2_814 is data in second units however to simplify the subsequent processing, the management server SV1 can execute the period accumulation processing 815 in order to calculate the activity level in longer time units. Here is shown an example of calculating from an activity level in seconds to an activity level in minutes. In one method, the number of second for activity states in a one minute period is summed and that one minute is seen as an activity state if the summed figure exceeds a threshold value. If the rate of seconds for activity states exceeded 50 percent for example then that one minute may be seen as an activity state. The management server SV1 then stores the degree of activity for the worker calculated in this way into the activity list 3_816. If the worker was in an activity state after each one minute of a time band or in other words, when estimated that the worker is acting an in positive way then a value "1" showing the degree of activity is stored; and if the worker was in an inactive state or in other words if estimated that the worker was not acting in a positive way then a value "0" is stored.

The above activity state judgment was made based on the acceleration frequency however a judgment may also be made based on other information. Activity state judgments for example may be made based on voice intensity. Even in this case, the same procedures described above may be applied except for utilizing voice intensity instead of the acceleration frequency (zero-cross value).

FIG. 12 is a drawing for describing the activity list 3_816 of the embodiment of the present invention.

The activity list 3_816 shown in FIG. 12 includes rows for a time 1201, a self-ID 1202, and an activity state 1203.

A time representing each time band (e.g., a start point time for each band) is stored in the time 1201. Information for identifying the worker is stored in the self-ID 1202. Values showing the degree of activity for each worker for each time band are stored in the activity state 1203. A value "1" indicating the activity state, and a value "0" indicating an non-activity state are stored in the example in FIG. 12.

Next, the management server SV1 makes a relation characteristics quantity matrix 818 that makes each two-person relation into a numerical value. The relation characteristic quantity is an index showing the status of a relation established between two persons by activities in particular such as face-to-face meetings and conversations. Various relation characteristic quantities for the two-person relation as described later on can be extracted from the face-to-face list 3_1100 and the activity list 3_816, and a relation characteristics quantity matrix 818 can be made for storing these extracted relation characteristic quantities by their type. The following items are for example given as the relation characteristic quantities. Here, an example describes the relation between the worker W1 whose USERID is "1", and the worker W2 whose USERID is "2".

One example of a relation characteristic quantity is the 2-person face-to-face time characteristic quantity (also described as face-to-face characteristic quantity) showing the time that the workers W1 and W2 met face-to-face, and also how that time was configured by which of the workers was active and to what extent. These characteristic quantities are grouped as shown in the 2-person face-to-face time matrix PCM in FIG. 13.

FIG. 13 is a drawing for describing the two-person face-to-face time matrix PCM of the embodiment of the present invention.

In this embodiment, the relation characteristic quantity is calculated as the face-to-face time RCH1, the bidirectional time RCH2, the pitcher time RCH3, the catcher time RCH4 and the sit-together time RCH5. These items are respectively stored in the face-to-face time matrix RCHMM1, the bidirectional time matrix RCHMM2, the pitcher time matrix RCHMM3, the catcher time matrix RCHMM4 and the sit-together time matrix RCHMM5. The relation characteristics quantity matrix is a general term for these matrices.

Each of the matrices stored as the relation characteristics quantity matrix 818 is described next in detail.

The face-to-face time RCH1 is an index showing to what extent the two-persons (e.g. workers W1 and W2) within the organization carried out just conversation during the target period. More specifically, the face-to-face time RCH1 is calculated by standardizing the time judged as face-to-face meetings between the workers W1 and W2 during the target period by the number of days for the target period while referring to the face-to-face list 3_1100. The management server SV1 calculates the face-to-face time RCH1 for all two person combinations within the organization and stores those results in the face-to-face time matrix RCHMM1 as shown in FIG. 15.

FIG. 15 is a drawing for describing the face-to-face time matrix RCHMM1 in the embodiment of the present invention.

In the face-to-face time matrix RCHMM1 shown in FIG. 15, the "0" through "12" on the vertical axis and the horizontal axis are ID for identifying each worker. The numerical values stored in the corresponding ID on the vertical axis and horizontal axis are the face-to-face time RCH1 for the two persons identified by the respective ID. The face-to-face time RCH1 corresponding to the ID "1" on the vertical axis and the ID "2" on the horizontal axis for example is "20". This figure shows that the time per day that the workers W1 and W2 met face-to-face during the target period was 20 minutes.

The bidirectional time RCH2 is an index showing to what extent the two persons actively conversed. The time for example that the worker W1 was mainly active in the conversation and the worker W2 was active in agreeing and so on are equivalent to the bidirectional time RCH2. More specifically, the bidirectional time RCH2 is calculated by the following procedure. The management server SV1 first of all specifies the time judged as the face-to-face time of workers W1 and W2 during the target period while referring to the face-to-face list 3_1100, and then sums the time judged that the workers W1 and W2 were both active during the specified time while searching the activity list 3_816, and then standardizes that total time by the number of days in the target period. The management server SV1 calculates the bidirectional time RCH2 for all of the two-person combinations in the organization and stores those results in the bidirectional time matrix RCHMM2.

The bidirectional time matrix RCHMM2 is omitted from the drawings but the format is the same as the face-to-face time matrix RCHMM1 (FIG. 15). In the bidirectional time matrix RCHMM2 assuming for example that the bidirectional time RCH2 corresponding to the vertical axis ID "1" and horizontal axis ID "2" is "5", then among the 20 minute time per day that the workers W1 and W2 met face-to-face during the target period (see FIG. 15), the bidirectional time matrix RCHMM2 shows that the time the workers W1 and W2 were both active was five minutes.

The pitcher time RCH3 is an index showing to what extent a worker (e.g. worker W1) took the lead in a face-to-face meeting with the other part (e.g. worker W2) in terms of conversation time. For example, the time that the worker W1 was unilaterally active in conversing and the worker W2 listened quietly is equivalent to the pitcher time RCH3 for worker W1. More specifically, the pitcher time RCH3 is calculated by the following procedure. The management server SV1 first of all specifies the time judged as the face-to-face meeting time for worker W1 and W2 during the target period while searching the face-to-face list 3_1100, and then sums the time that the worker W1 was judged as active and the worker W2 was judged as inactive during the above specified time while searching the activity list 3_816, and next standardizes that total time by the number of days in the target period. The management server SV1 calculates the pitch time RCH3 for all of the two-person combination in the organization and stores those results in the pitcher time matrix RCHMM3.

The pitcher time matrix RCHMM3 is omitted from the drawings but the format is the same as the face-to-face time matrix RCHMM1 (FIG. 15). Assuming for example in the pitcher time matrix RCHMM3 that the pitcher time RCH3 corresponding to a vertical axis ID "1" and a horizontal axis ID "2" is "10", then among the 20 minute time per day that the workers W1 and W2 met face-to-face during the target period (see FIG. 15), the pitcher time matrix RCHMM3 shows the time the workers W1 was active and the worker W2 was inactive (namely, the pitcher time RCH3 of worker W1) was 10 minutes.

The catcher time RCH4 is the opposite of the pitcher time, and is an index showing to what extent the other party (e.g. worker 2) meeting face-to-face with a certain worker (e.g. worker W1) took the lead during the conversation time. More specifically, the catcher time RCH4 is calculated by the following procedure. The management server SV1 first of all specifies the time judged as the face-to-face meeting time for worker W1 and W2 during the target period while searching the face-to-face list 3_1100, and then sums the time that the worker W2 was judged as active and the worker W1 was judged as inactive while searching the activity list 3_816, and next standardizes that total time by the number of days in the target period. The management server SV1 calculates the catcher time RCH4 for all of the two-person combinations in the organization and stores those results in the catcher time matrix RCHMM4.

The catcher time matrix RCHMM4 is omitted from the drawings but the format is the same as the face-to-face time matrix RCHMM1 (FIG. 15). Assuming for example for the catcher time matrix RCHMM4, that the catcher time RCH4 corresponding to a vertical axis ID "1" and a horizontal axis ID "2" is "3", then among the 20 minute time per day that the workers W1 and W2 met face-to-face during the target period (see FIG. 15), the catcher time matrix RCHMM4 shows the time that the worker W1 was inactive and the worker W2 was active (namely, the catcher time RCH4 of worker W1) was 3 minutes.

The sit-together time RCH5 is an index showing to what extent the two persons were carrying out an inactive conversation. The sit-together time RCH5 is for example equivalent to the state during a large conference with many persons, where the participating workers W1 and W2 are face-to-face but both are merely sitting and listening quietly. The sit-together time RCH5 is more specifically calculated by the following procedure. The management server SV1 first of all specifies the time judged as the face-to-face meeting time for worker W1 and W2 during the target period while searching the face-to-face list 3_1100, and next sums the time that the workers W1 and W2 were both judged as inactive during the above specified period while searching the activity list 3_816, and then standardizes that summed time per the number of days in the target period. The management server SV1 calculates the sit-together time RCH5 for all of the two-person combinations in the organization and stores those results in the sit-together time matrix RCHMM5.

The sit-together time matrix RCHMM5 is omitted from the drawings but the format is the same as the face-to-face time matrix RCHMM1 (FIG. 15). Assuming for example that the sit-together time RCH5 corresponding to a vertical axis ID "1" and a horizontal axis ID "2" is "2", then among the 20 minute time (see FIG. 15) per day that the workers W1 and W2 met face-to-face during the target period, the time that both the workers W1 and W2 were inactive is shown as two minutes.

The above relation characteristic quantities were items for indexing an absolute time per day however these relation characteristic quantities can be utilized not only for absolute times but also the rates for the face-to-face time as indices. The bidirectional rate RRCH2, pitcher rate RRCH3, catcher rate RRCH3, and sit-together rate RRCH4 are the rates that the bidirectional time RCH2, the pitcher time RCH3, the catcher time RCH3, and the sit-together time RCH4 are respectively divided by the face-to-face time RCH1. These characteristic quantity rates may also be stored in the bidirectional percent matrix RRCHMM2, the pitcher rate matrix RRCHMM3, the catcher rate matrix RRCHMM3, and the sit-together rate matrix RRCHMM4 as items found for an optional two people.

Another usage alternative rather than simply as a rate or an absolute time for the activity state during the face-to-face time, is as an index of the extent that mutual activity levels are affecting each other, and this information can also be utilized as the relation characteristic quantity.

The synchronicity degree RCH1 is an index for whether another party and one's own activity level are matched or in synchronization with each other. A high degree of synchronicity signifies that the other party's activity rhythm matches one's own activity rhythm and that the relation is often seen as long-term relationship and good mutual understanding. Conversely, a relation with a low degree of synchronicity signifies a relation where mutual communication is mostly inconsistent or mismatched. In communication with a high degree of synchronicity for example, though the worker W2 is in an inactive state such as a relaxed state, there is conversely a low probability that the worker W1 will transition from a non-synchronous inactive state to an active state. Conversely, when the worker W2 is excited and in an active state while also using body and hand gestures, there is a high probability that the worker W1 will transition from a relaxed inactive state to the same type of excited state.

An index showing this synchronicity degree may utilize a value showing to what extent the probability of a transition in a worker's activity state will affect the activity state of the other party in the face-to-face meeting. Transition patterns for these activity states are described while referring to FIG. 14.

FIG. 14 is a drawing for describing the transition patterns in the activity state in the embodiment of the present invention.

Activity state transition patterns are four patterns for the pre-state and post-state of one's self-activity state and two patterns each for the other party's pre-state activity state for a total of eight patterns such as ST11, ST12, ST13, ST14, ST21, ST22, ST23, ST24 shown in FIG. 14. Here, "self" implies a worker that is affected by the activity, and the "other party" implies a worker whose activity applies an effect to the "other party". Consider for example the effect that the worker W1 and worker W2 have on each other; here the management server SV1 extracts the time bands where the workers W1 and W2 are meeting continuously face-to-face for two times, while searching the face-to-face list 3_1100, and extracts the activity states of the workers W1 and W2 for those two times from the activity list 3_816, and judges which transition state these are from the eight transition states. For example, if the activity states of W1 and W2 at 12:00 are {0,1} and the W1, W2 activity states at 12:01 are {1,1} then the effect that the worker W1 receives from worker W2 is "self inactive, other party active" in the pre-state, and "self active" in the post-state so that the transition state of worker W1 is ST22. On the other hand, if the worker W2 is receiving effects from the worker W1, and the pre-state is "self active, other party inactive" and the post-state is "self active" then the worker W2 state is ST23. The management server SV1 counts the number of self-occurrences of the transition states ST11, ST12, ST13, ST14, ST21, ST22, ST23, and ST24 for the total continuous face-to-face time. The synchronicity degree RCH6 is found from the number of transition state self-occurrences using the following formula (1). Results from finding the synchronicity degree RCH6 between an optional two persons are stored in the synchronicity matrix RCHMM6.

$$RCH6 = \frac{STN22}{STN12 + STN22} - \frac{STN21}{STN11 + STN21} \quad (1)$$

In formula (1) the first term on the right side is the percentage of transitions from "self inactive, other party active" to "self active"; and the second term is the percentage of transitions from "self inactive, other party inactive" to "self active". If the worker W1 for example receives absolutely no effects from the worker W2 activity state then the first term and second term are assumed the same value and in this case the value of synchronicity degree RCH6 is 0. The above description therefore shows that the larger the synchronicity degree value RCH6 of worker W1 with the worker W2, the easier for worker W1 to sustain affects from the worker W2 activity state (in other words, in the case of the worker W2 activity level, the worker W1 is more likely to be at an active level due to sustaining this effect).

The synchronicity matrix RCHMM6 is omitted from the drawings but the format is the same as the face-to-face time matrix RCHMM1 (FIG. 15). The synchronicity degree RCH6 showing the effect that the worker W1 receives from the worker W2 is for example stored in the field corresponding to the vertical axis ID "1" and the horizontal axis ID "2" of the synchronicity matrix RCHMM6.

In the process for finding the relation characteristic quantity, the case where only the two persons, worker W1 and W2 are simultaneously meeting face-to-face, and the case where there are third parties other than workers W1 and W2 are handled using equivalent values. However, the presence of a third party may in fact affect the states (e.g. activity states) of the workers W1 and W2. In order to eliminate such third party effects, the above relation characteristic quantity can be found by targeting just the two persons W1 and W2 among the face-to-face list 3.

The relation characteristics accumulation section 820 for making the team relation characteristics list 821 that clusters each person's relation characteristics quantity per each structural relation with the other party based on the relation characteristics quantity matrix 818 is described next. Those relation characteristic quantities showing individual characteristics such as that a certain person requires sufficient face-to-face time with his immediate boss but does not require more time spent with immediate subordinates are found, and this information is then stored in the team relation characteristics list 821. A specific procedure for calculating these types of relation characteristics quantities is given below.

The management server SV1 utilizes the previously found relation characteristics quantity matrix 818 and the team relation matrix 819 to make the team relation characteristics quantity list 821 show what type of relation an individual has contrived for system relations with each person. Among these relation characteristic quantities, an example is described using the face-to-face time RCH1. According to the team relation matrix TRM (FIG. 7), the direct subordinates F1 of worker W2 are for example are the workers W3 and W4. According to the face-to-face time matrix RCHMM1 (FIG. 15), the face-to-face times RCH1 of worker W2 with the workers W3 and W4 are respectively 12 minutes and 10 minutes. The face-to-face time of worker W2 with the direct subordinates F1 stored in the team relation characteristics list 821 is therefore 11 minutes after taking the average of 10 minutes and 12 minutes.

FIG. 16 is a drawing showing the team relation characteristics list of the embodiment of the present invention.

The relation characteristics quantities for each person in each structural relation are summarized as shown above and stored in the team relation characteristics list TRCL (equivalent to team relation characteristics list 821 in FIG. 8). This team relation characteristics list TRCL is comprised of a USERID section 1701 to store the identifier of each user (worker), and a team (also called structure) relation characteristics section 1703. Each line corresponds to each person (e.g. workers W0 through W12), and relation characteristics quantities for the structural relation between each person and another person are stored in each row of the structural relation characteristics section 1703. The above description utilized the face-to-face times RCH1 with the direct subordinates F1 as an example but relation characteristics quantities such as the pitcher time RCH3, catcher time RCH4, bidirectional time RCH2, sit-together time RCH5 and synchronicity degree RCH6 may be summed for each structural relation such as with the direct subordinates F1, 2 ranks lower subordinate F2, direct boss S1 and so on, and stored in the team relation characteristics list TRCL.

In the above example, the relation characteristic quantity for each structural relation was found by calculating the average relation characteristic quantity of the other party in the same structural relation but distribution characteristics other than the average such as the maximum value, minimum value, mode value, center value, and quartile value may also be calculated as relation characteristic quantities for each structural relation.

The time analysis section 822 in FIG. 8 calculates characteristic quantities for persons acquirable from sensor node SN0 other than during a face-to-face meeting analyzed in the relation analysis section 817. For example, the sensor SN0 wear time and non-wear time measured from the wear information of sensor SN0, and the activity time and non-activity time during a non-face-to-face measured from the face-to-face list and activity list 3 and so on can be calculated. These characteristic quantities are stored in the time characteristics quantity list 823 in the same format as the team (or structural) relation characteristics quantity list 821. The management server SV1 makes an individual characteristics quantity list 824 by combining the team relational characteristics quantity list 821 with the time characteristics quantity list 823.

FIG. 17 is a drawing showing the individual characteristics list of the embodiment of the present invention.

The individual characteristics list ICL in FIG. 17 (equivalent to the individual characteristics quantity list 824 in FIG. 8) is a list that clusters the team relation characteristics list TRCL and time characteristics quantity list 823 for each user. This individual characteristics list ICL is comprised of a USERID section 1701 storing the identifiers for each user (worker), time characteristic section 1702 corresponding to the time characteristics quantity list 823, and the structural relation characteristics section 1703 corresponding to the team relation characteristics list TRCL (821).

The projected relation estimate process PR (FIG. 5) is described next.

Figure 18:
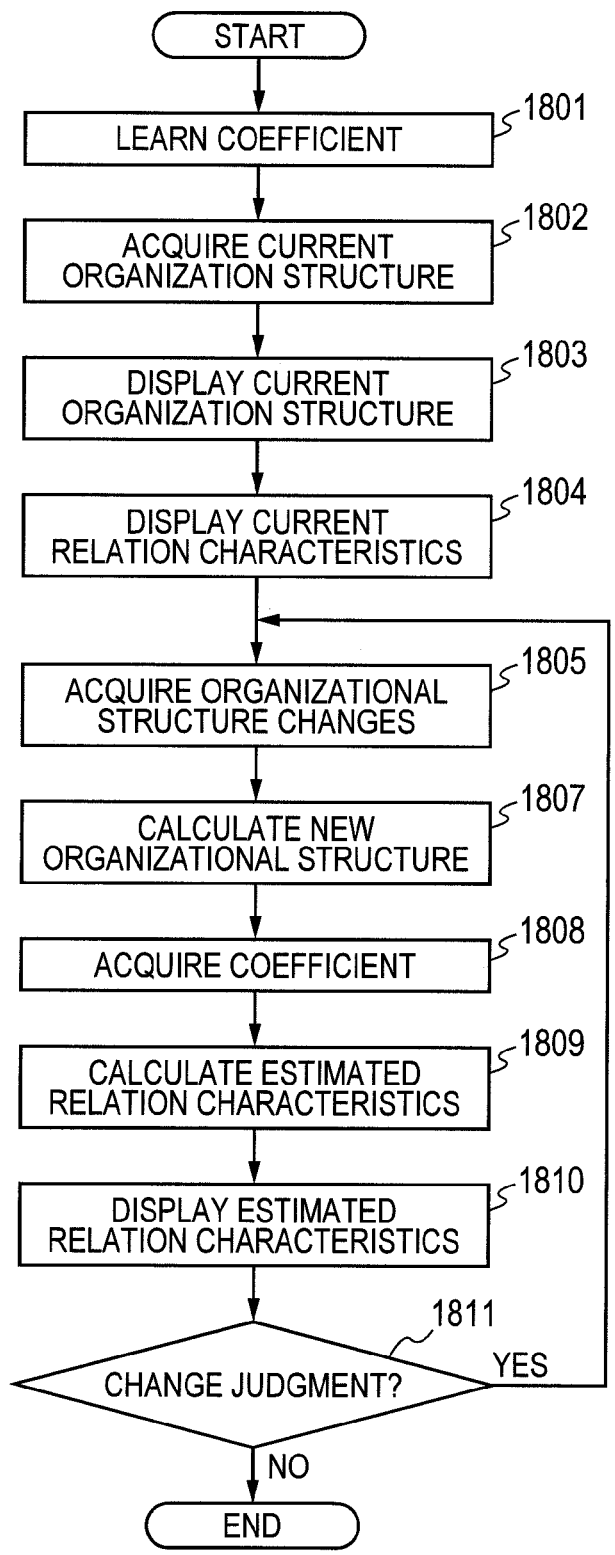
FIG. 18 is a flowchart of the relation estimate process executed by the management server of the embodiment of the present invention.

FIG. 18 is a flowchart of the projected relation estimate process PR executed by the management server SV1 of the embodiment of the present invention.

Here, one can see a procedure where the user inputs the organization structure table needing an estimate, and estimate of how the relation between each two person changed in the applicable structure is made, the estimated results are visualized, and those results are fed back to the user. The user decides whether or not to change the structure any further based on this feedback information, and this process continues until a structure is established. An example for the case where the relation characteristic quantity estimated in detail for each process is the face-to-face time is described next.

In the coefficient learning section 1801, the management server SV1 implements learning for estimating the relation characteristics quantity. This process is described later on in detail (See FIG. 19).

In the current organization structure acquire section 1802 of FIG. 18, the management server SV1 acquires the current organization information from the individual information table TEAMINFO, and stores this information in the estimated individual information table TEAMINFO2. The estimated individual information table TEAMINFO2 is omitted from the drawings but the format is the same as the individual information table TEAMINFO. The contents of the estimated individual information table TEAMINFO2 are identical to the individual information table TEAMINFO immediately after executing the current organization structure acquire section 1802.

In the current organization structure display section 1803 of FIG. 18, the management server SV1 display the current organization structure information acquired from the individual information table TEAMINFO. More specifically, the management server SV1 may show a text display of the individual information table unchanged such as in FIG. 4, and may display a network graph with the structural relations as an edge, and the persons set as nodes as in FIG. 3, and may also display tactile information such as braille or audio information including voice information.

In the current relation characteristics quantity display section 1804 of FIG. 18, the management server SV1 displays two-person relation characteristics quantity values obtained from the relation characteristics quantity matrix for the current organizational structure on the display unit DISP1.

Figure 20:
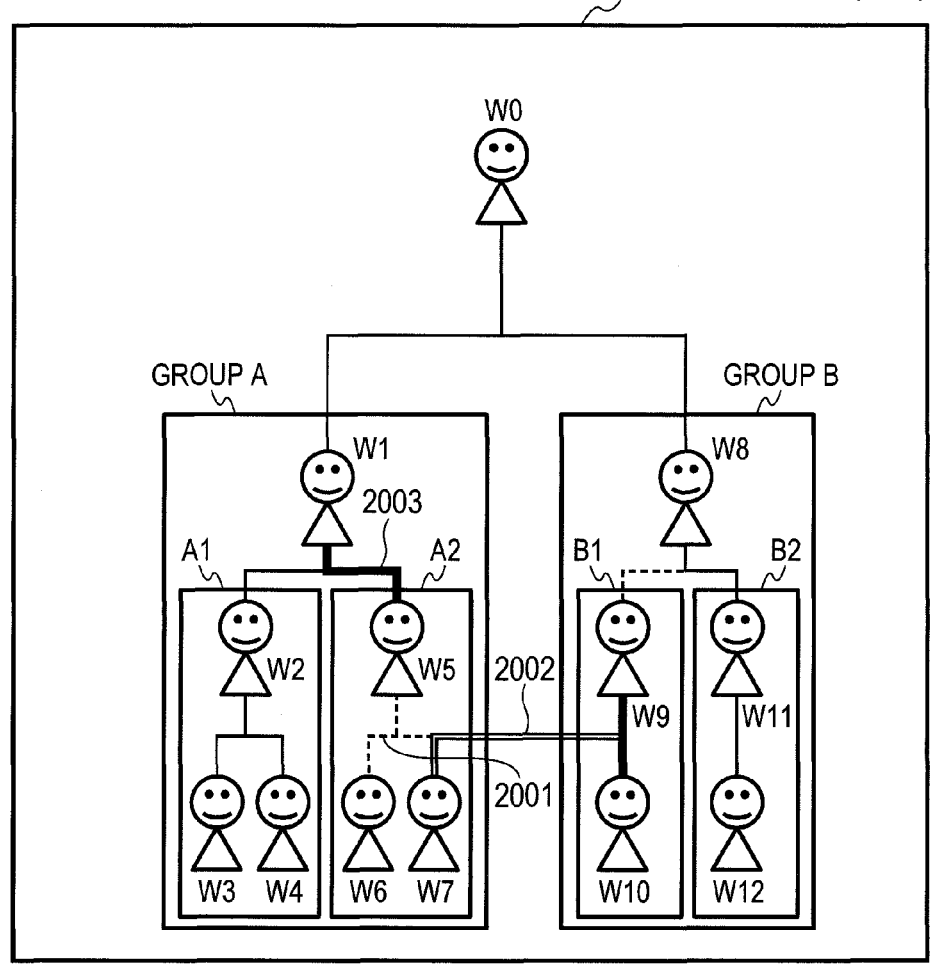
FIG. 20 is a drawing for describing the relational characteristics display diagram shown on the display unit of the embodiment of the present invention.

FIG. 20 is a drawing of the relation characteristic quantity display diagram MCD shown on the display unit DISP1 of the embodiment of the present invention.

FIG. 20 shows a specific example of a current two-person relation characteristics quantity for the organization in FIG. 3, displayed superimposed in the organization chart showing on the structural relation within the organization. The example here shows the face-to-face time RCH1 as the characteristic quantity so the current actual value of the face-to-face time RCH1 acquired by the sensor is expressed here as the edge.

The edge thickness depends on the actual value of the face-to-face time RCH1 and the longer the time, thicker the edge that is displayed. The intensity of the two-person relation the relation the example in FIG. 20 expressed a certain two person face-to-face time RCH1 that was below a threshold value not by narrowing the edge extending between the two persons, but by not displaying the edge. Also, in order to emphasize the difference between the actual value and the assumed structure, a relation between the direct boss/subordinate in a structure where the face-to-face time RCH1 is below the threshold value is displayed as a broken (dotted) line at the edge between the two persons (edge 2001); and a relation between the two persons where the face-to-face time RCH1 is above a threshold value even though there is no direct boss/subordinate in the structure is displayed by extending a double-line edge between them (edge 2002).

Besides the above methods, other methods for emphasizing the edge may include methods to change the line shape or the color. Non-directional characteristic quantities for the face-to-face time RCH1 were utilized in this example however for directional indices such as the pitcher time RCH3, may also express the degree of validity by arrows or line width.

Another example for displaying the value of the two-person characteristic quantity is described here.

Figure 21:
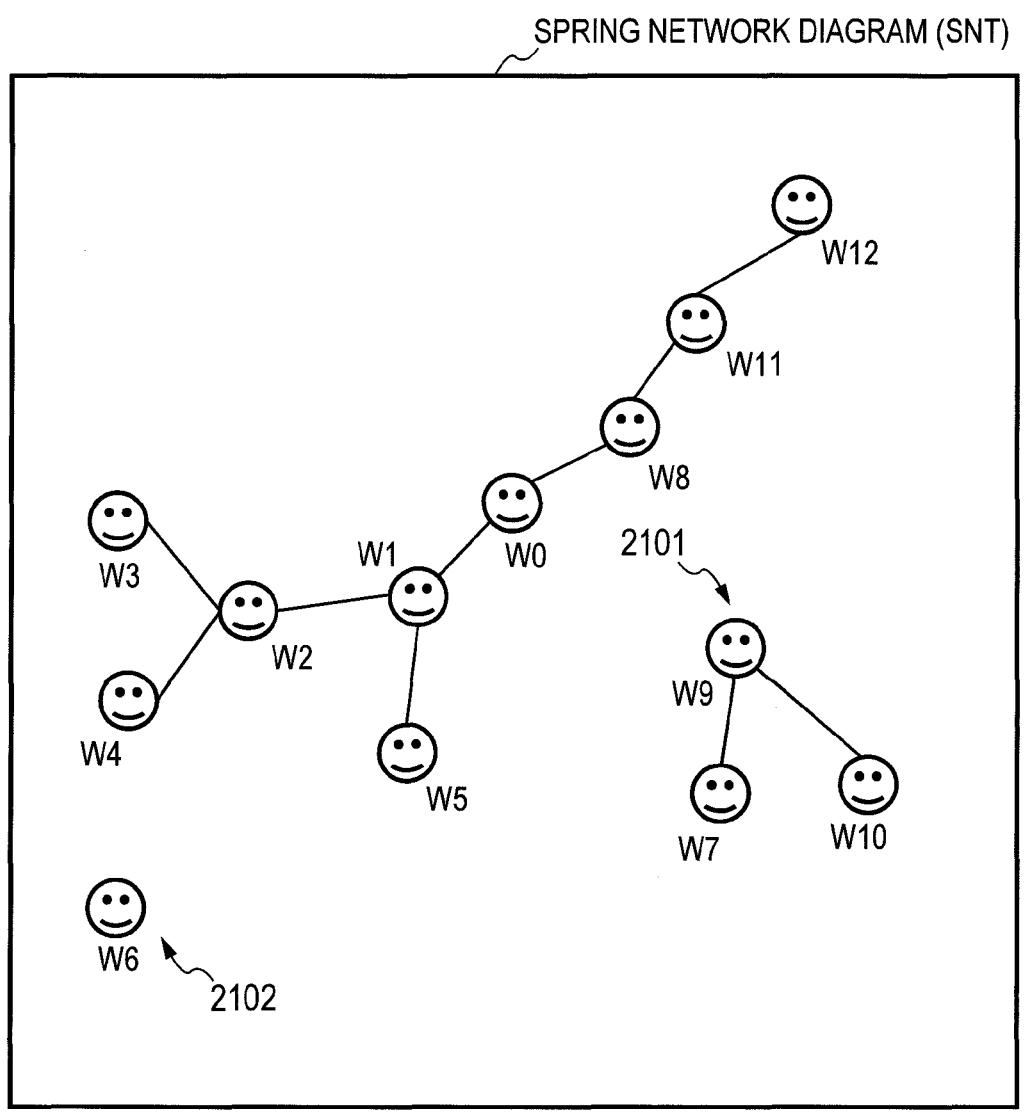
FIG. 21 is a drawing for describing the spring network diagram shown on the display unit of the embodiment of the present invention.

FIG. 21 is a drawing for describing the spring network diagram SNT shown on the display unit DISP1 of the embodiment of the present invention.

A two-person relation may also be displayed as shown by the spring network diagram SNT in FIG. 21, that uses a spring model for the attraction force between nodes corresponding to each worker for expressing the relation characteristic quantity matrix values (e.g. relation characteristic quantities such as the face-to-face time RCH1) rather than utilizing a placement that is dependent on the structural relation. This method is capable of emphasizing the actual relation. Advantages of using the spring network diagram SNT are that discovering groups differing from the structural diagrams such as the group 2010 and persons separate from the organization such as the node 2012 is easy without using structural information.

Figure 22:
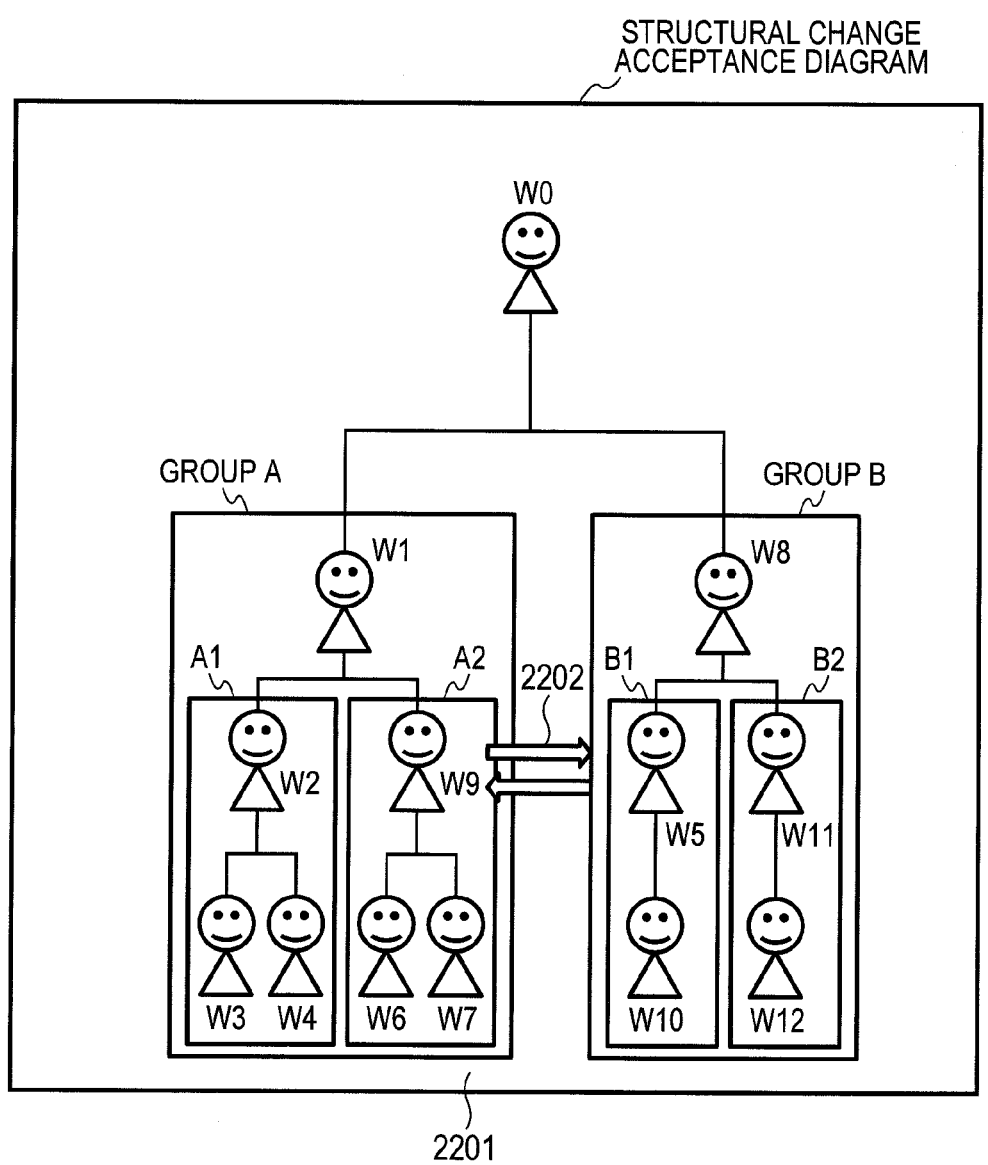
FIG. 22 is a drawing for describing the structural change acceptance diagram of the embodiment of the present invention.

In the organization structural change acquisition unit 1805 process, the management server unit SV1 acquires current organization structural change requests from the user as queries. The case where the user has requested interchanging the worker W5 and W9 structural positions is described here. Interchanging the structural position is equivalent to swapping the structural relation of the two persons, and more specifically is equivalent to interchanging the user names and ID of the two persons in the individual information table TEAMINFO (or the estimated individual information table TEAMINFO2). The user inputs information for example by the following method. The user may input partial information showing the structural position of the workers W9 and W5 to swap, from an input/output PC1 by making entries onto the command line. The user may also employ a graphical operation if a structural change input diagram such as shown in FIG. 22 is displayed, by using a GUI to select and to shift the nodes corresponding to the displayed workers W9 and W5 by way of the input/output PC1 and the display unit DISP1 as shown in the procedure 2202. The user may also make a batch registration from the input/output PC1 of the information for all organization members after the change.

FIG. 22 is a drawing for describing the structural change input diagram displayed on the display unit DISP1 of the embodiment of the present invention.

The structural change input diagram prior to entering the structural change the user wants to implement is for example identical to the organization chart ORGCHART shown in FIG. 3. Here, when the user wants to estimate the communication patterns (e.g. face-to-face times for an optional two people within the organization after swapping) for interchanging the worker W9 and W5 structure positions, the user performs a graphical operation to interchange (procedure 2202) the symbols showing the workers W9 and W5 shown on the display unit DISP1. The input of the worker W9 and W5 structure positions for swapping is performed in this way. An organization chart 2201 showing the interchanged positions of workers W9 and W5 is then subsequently displayed.

In the new organizational structural calculation unit 1807 process in FIG. 18, the management server SV1 reflects the above acquired change sections in the organization structure, into the estimated individual information table TEAMINFO2. For example, if a query was acquired from the input/output PC1 about interchanging the worker W9 and W5 structural positions per the organization structural change acquisition unit 1805 process, then the management server SV1 swaps the contents on the line corresponding to the worker W5 and the contents of the line corresponding to the worker W9 in the estimated individual information table TEAMINFO2 the same as in FIG. 4, or in other words swaps the GROUP-ID through GROUP-FOLLOWERID organization structural information while leaving the USERID and UNAME. Consequently, "B", "0", "B1", "1", "3", "W8" and "W10" are respectively stored in the GROUP-ID through GROUP-FOLLOWERID corresponding to USER-ID "5" and UNAME "W5"; and an "A", "0", "A2", "1", "3", "W1" and "W6, W7" are respectively stored in the GROUP-ID through GROUP-FOLLOWERID corresponding to USER-ID "9" and UNAME "W9". Moreover, the management server SV1 changes the "W5" stored on other lines to "W9", and changes the "W9" stored on other lines to "W5".

The management server SV1 makes the estimated team relation matrix TRM2 by utilizing the estimated individual information table TEAMINFO2. This estimated team relation matrix TRM2 is omitted from the drawings but is the same format as the team relation matrix TRM. The team relation matrix TRM2 is formed based on the estimated individual information table TEAMINFO2 using the procedure described while referring to FIG. 7.

In the coefficient acquisition unit 1808 process in FIG. 18, the management server SV1 acquires the coefficient that was learned in the learn coefficient process 1801. However, as described later on, if the learn coefficient process 1801 was omitted then a prepared coefficient (e.g. a parameter acquired in advance in another organization, etc.) is acquired.

In the estimated relation characteristic quantity calculator unit 1809 process in FIG. 18, the management server SV1 calculates the relation characteristic quantities among two persons using the estimated team relation matrix TRM2 that was provided and the pre-stored individual characteristic list ICL (FIG. 17). The relation characteristic quantity is described here utilizing the face-to-face time. The description here covers the case where one wants to estimate the resulting relation between a transferred worker W9 and the worker W1 serving as the new boss.

The management server SV1 makes an individual characteristic quantity vector V for each person based on the individual characteristic list ICL. The management server SV1 stores a 1 in the first element of the individual characteristic quantity vector V and subsequently stores all the indices for the individual characteristic list in the elements. The management server SV1 estimates to what extent the face-to-face time will become when for whatever the two-person relation has become by utilizing the individual characteristic quantity vector V. Here, the estimate method for a linear type is described.

$$S_{(1,9)} = V_{W1} \cdot V_{W9}^t \quad (2)$$

Here, $V_{W1}$ denotes the individual characteristic quantity vector V for the worker W1; $V_{W9}^t$ denotes the transfer vector for the individual characteristic quantity vector V; and $S_{(1,9)}$ denotes the individual characteristic quantity reciprocal matrix. This individual characteristic quantity reciprocal matrix is a matrix for finding the compatibility of the individual characteristic quantity vectors for the workers W1 and W9. The products of the individual characteristic quantity vector elements are required as shown in formula (3).

$$S_{(1,9)} = \begin{bmatrix} 1 & V_{W9,1} & \ldots & V_{W9,N} \\ V_{W1,1} & V_{W1,1} * V_{W9,1} & \ldots & V_{W1,1} * V_{W9,N} \\ \ldots & \ldots & \ldots & \ldots \\ V_{W1,N} & V_{W1,N} * V_{W9,1} & \ldots & V_{W1,N} * V_{W9,N} \end{bmatrix} \quad (3)$$

The face-to-face time for the workers W1 and W9 is basically determined by the $S_{(1,9)}$ calculated from the individual characteristics of workers W1 and W9. However, the face-to-face time is also affected in no small way by whether there was an interview in the past between W1 and W9. Whereupon the estimated time $R_{1,9}$ being sought is obtained by finding the sum of the terms of each element in $S_{(1,9)}$ and the terms in the worker W1 and W9 past face-to-face time $MT_{1,9}$ as shown in formula (4). The face-to-face $MT_{1,9}$ is equivalent to the elements in the row corresponding to ID "9", of the line corresponding to ID "1" in the face-to-face time matrix RCHMM1. Here, the coefficient matrix A and the coefficient B are the coefficients that affect the face-to-face time of each term.

$$R_{1,9} = \Sigma_{<I,J>} A_{IJ} \cdot S_{(1,9)_{IJ}} + B \cdot MT_{1,9} \quad (4)$$

This coefficient matrix A and coefficient B are different for each two-person relation shown in FIG. 6. A method for deriving these items is described in detail later on. The formula 5 shows a specific example of the formula (4). Here, the results from implementing the learn coefficient process 1801 and the face-to-face time of the direct boss and subordinate are estimated after determining: the element of how much average face-to-face time the boss takes with subordinate that is one rank lower, the element of what percent of the time the boss is listening (catcher rate) during a face-to-face meeting with subordinate one rank lower, the element of what percent of the time the boss is actively speaking (pitcher rate) during a face-to-face meeting with subordinate one rank lower, and the element of past face-to-face meeting time between the two persons; and are then estimated.

$$R_{1,9}=0.1*V_{W1}\text{(face-to-face time with subordinate one rank lower)}+40*V_{W1}\text{(catcher rate with subordinate one rank lower)}*V_{W9}\text{(pitcher rate with superior one rank higher)}+0.2*MT_{1,9} \quad (5)$$

Here, $V_{W1}$ (face-to-face time with subordinate one rank lower) denotes the face-to-face time RCH1 with the (direct) subordinate one rank lower than worker W1. The $V_W$ (catcher rate with subordinate one rank lower) denotes the percentage of catcher time among the face-to-face time RCH1 between worker W1 and the subordinate one rank lower. These items can be read from the line for the Self ID "1" of the individual characteristic quantity list ICL (FIG. 17) or can be calculated from the values that were read. The $V_{W9}$ (pitcher rate with boss one rank higher) in the same way, is the percentage of pitcher time among the face-to-face time RCH1 between the worker W9 and the boss one rank higher. This item can be calculated from values read out from the line for Self ID "9" of the individual characteristic quantity list ICL.

The management server SV1 finds all the two-person estimated face-to-face times in the same way and stores these times in the estimated face-to-face time matrix R (not shown in drawing). This estimated face-to-face time matrix R is equivalent to the projected relation characteristics matrix PRM in FIG. 5. The estimated face-to-face time matrix R is omitted from the drawings but the format is the same as the face-to-face time matrix RCHMM1.

The estimated relation characteristic display process 1810 is a process for feeding back the estimated results to the user. The expression method may be identical to the current organizational structure display unit 1804 process. Here however, the node expressing the transferred person may also be emphasized by the use of hatch marks or colors and the change in the face-to-face quantity due to the transfer may also be shown by emphasizing the edge thickness, color, shape or flashing point in order to focus attention on the change point or changed effect.

The change decision unit 1811 process allows the user to check the results output by the estimated relation characteristic display process 1810, and is a process to decide whether to perform further changes or not. User judgment results can be acquired by CUI, GUI or voice, can be returned to the organization structure change acquisition process if there are additional changes, and if there are no additional changes then the change decision unit 1811 process terminates the flow of the projected relation estimate process PR.

The relation characteristic quantity for estimation here is not limited to the face-to-face time, and all of the characteristic quantities stored in the relation characteristics quantity matrix may serve as a quantity for estimation. The management server SV1 for example may calculate the estimated bidirectional time and estimated pitcher time and so on by the same methods as described above, and store those results in the projected relation characteristics matrix PRM such as the estimated bidirectional time matrix (not shown in drawing), estimated pitcher time matrix (not shown in drawing), etc.

Figure 19:
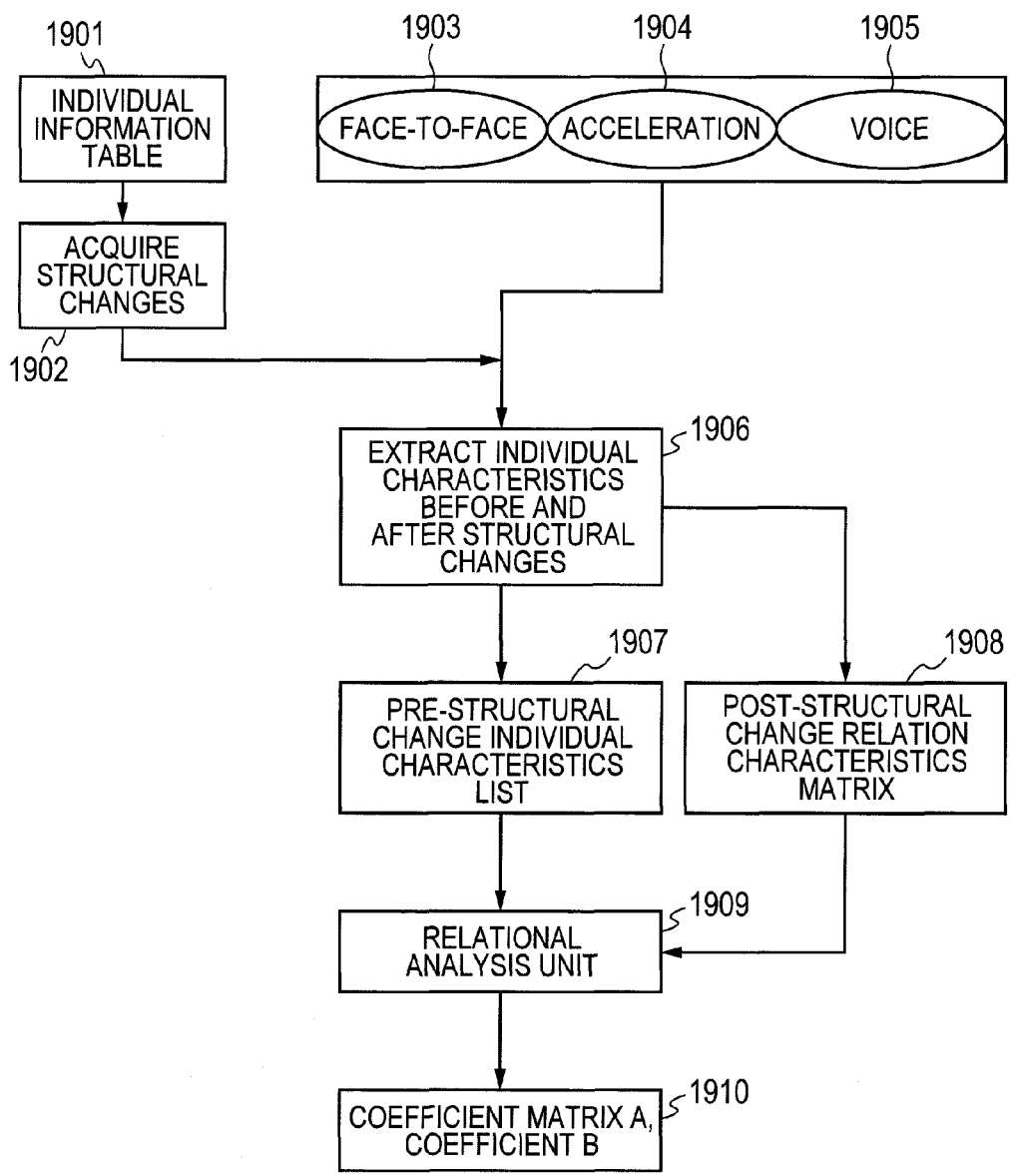
FIG. 19 is a flowchart of the coefficient learning process executed by the management server f the embodiment of the present invention.

FIG. 19 is a flowchart of the coefficient learning process executed by the management server SV1 of the embodiment of the present invention.

FIG. 19 shows in detail the learn coefficient process 1801 process flow in the projected relation estimate process PR.

In order to estimate the communication pattern (e.g. face-to-face time for an optional two persons) after the relational estimate process PR in this process made a final change in the organization structure; this process utilizes the change such as occurs in the face-to-face quantity when there was a past structural change in the applicable organization, to learn the coefficient B and the coefficient matrix A serving as the estimation parameters in the formula (4) for the organization. This process is necessary when one needs to reflect characteristics for each organization or when one needs to raise the estimation accuracy however this process might not always prove necessary in cases where utilizing good parameters obtained in advance from other organizations without performing learning. If performing learning, then perform the learning by utilizing sensor data from before and after the structural change was made in the applicable organization. A specific example of estimating the face-to-face time between a subordinate and direct boss is described next.

In the structural change acquisition process 1902 in FIG. 19, in order to perform learning before and after a structural change was made, the management server SV1 acquires the period where an actual structural change was made in the past. More specifically, the period in which the individual information table TEAMINFO (1901) was rewritten is the period where the structural change occurred and so is acquired from the individual information table TEAMINFO change log. In order to ensure the purpose for utilization, no errors such as simple table operating errors are allowed to remain in the change log.

In the extract individual characteristics quantity before and after structural change process 1906 in FIG. 19, the management server SV1 outputs the pre-structural change individual characteristics quantity list ICL (1907) and the post-structural change relational characteristics quantity matrix (1908). This step is basically the same as the collect individual characteristic process CIC in FIG. 8. However, this process makes use of the sensor data from before the structure was changed (e.g. face-to-face data 1903, acceleration data 1904 and voice data 1905, etc.) to calculate results per the pre-structural change individual characteristics list ICL, and makes calculations utilizing sensor data from after the structure was changed for the post-structural change relational characteristics quantity matrix.

In this process, an optional period ANT can be set for calculating the post-structural change relational characteristics quantity matrix. This period can be set for example to utilize data from one day to one month after the change was made. When long-term data is needed, the period ANT can be set from a short period to a long period by setting so as to utilize data from six months to a year after the change was made, and the communication pattern then estimated after the optional time has expired.

In the relational analysis process 1909 in FIG. 19, coefficient matrix A and coefficient B learning is performed by utilizing the pre-structural change individual characteristics quantity list ICL and post-structural change relational characteristics quantity matrix. More specifically, the process by way of this structural change is described using the structural change shown in FIG. 29 as an example.

FIG. 29 is a drawing for describing the structural change in the embodiment of the present invention.

The post-structural change organization chart 2902 is identical to the chart shown in FIG. 3 so a description is omitted here. The structural change shown in FIG. 29 is the interchanging of the worker W2 and W5 structural positions, and moreover the interchanging of the worker W9 and W11 structural positions. Therefore, except for the structural positions of the workers W2, W5, W9 and W11, the pre-structural change organization chart 2901 is identical to the post-structural change organization chart 2902.

In the relational analysis process 1909, the management server SV1 first of all extracts the structural relations for learning. The example used here is the case where estimating the face-to-face time of the worker W1 and W9 serving as the direct boss and subordinate so among the twelve combinations of direct boss-subordinate relations in the organization shown in the post-structural change organization chart 2902 in FIG. 29 comprised of: {W0, W1}, {W0, W8}, {41, W2}, {W1, W5}, {W8, W9}, {W8, W11}, {W2, W3}, {W2, W4}, {W5, W6}, {W5, W7}, {W9, W10}, {W11, W12}, there were ten relations altered by the present structural change (including workers whose structural position changed due to the present structural change as follows: {W1, W2}, {W1, W5}, {W8, W9}, {W8, W11}, {W2, W3}, {W2, W4}, {W5, W6}, {W5, W7}, {W9, W10}, {W11, W12}.

The management server SV1 performs coefficient matrix A and coefficient B learning per formula (4). The learning example shown here is here linear multiple regression analysis. In this case, the least-squares method was implemented using applicable pairs in the post-structural change characteristic quantity matrix (namely the workers W1 and W9) as the response variables, and using applicable pairs for each element of the individual characteristics quantity reciprocal matrix as the explanatory variables. Among analysis results for each coefficient, the coefficients for each element in the post-structural change characteristic quantity matrix were the coefficient matrix A, and coefficients for the face-to-face time was the coefficient B. In the example here, the coefficient learning was based on a one-time structural change however in actual analysis, the coefficient matrix A and the coefficient B are determined by performing the above multiple regression analysis using all of the structural change data acquired in the structural change acquisition 1902.

The relation coefficient matrix A and the coefficient B determined in this way show to what extent a relation characteristic quantity (e.g. the face-to-face time RHC1) for two-persons after a past structural change is dependent on the characteristic quantity (e.g., relation characteristic quantity stored in relational characteristics section 1703, sensor wear time stored in the time characteristic section 1702, and so on, as well as the past face-to-face time MT for two persons and so on, or their product) for two persons prior to the applicable structural change. Therefore, by applying the relation coefficient matrix A and the coefficient B to characteristic quantities relating to the behavior of the currently measured worker, one can estimate how the relation characteristic quantity of the two persons will change due to the upcoming structural change.

The formula (5) for example is equivalent to the case where the coefficients contained in the relation coefficient matrix A are set as a coefficient "0,1" for $V_{W1}$ (pitcher rate with boss one rank higher) and a coefficient "40" for $V_{W1} \times V_{W9}$ (catcher rate with subordinate one rank lower); and a coefficient B is set as "0,2". These coefficients show that the two person face-to-face time for a direct boss-subordinate relation is most greatly dependent on the product of the catcher rate with a one rank lower subordinate and the pitcher rate with a one rank higher boss, and moreover is slightly dependent on the face-to-face time with a one rank lower subordinate, and the past two person face-to-face time in the applicable direct boss-subordinate relation; and is not dependent at all on other characteristic quantities (or only slightly dependent at a level small enough to be ignored).

The above example determined the coefficient by using the least-squares method; however, the coefficients may also be determined by an optional machine learning method other than the least-squares method.

Figure 23:
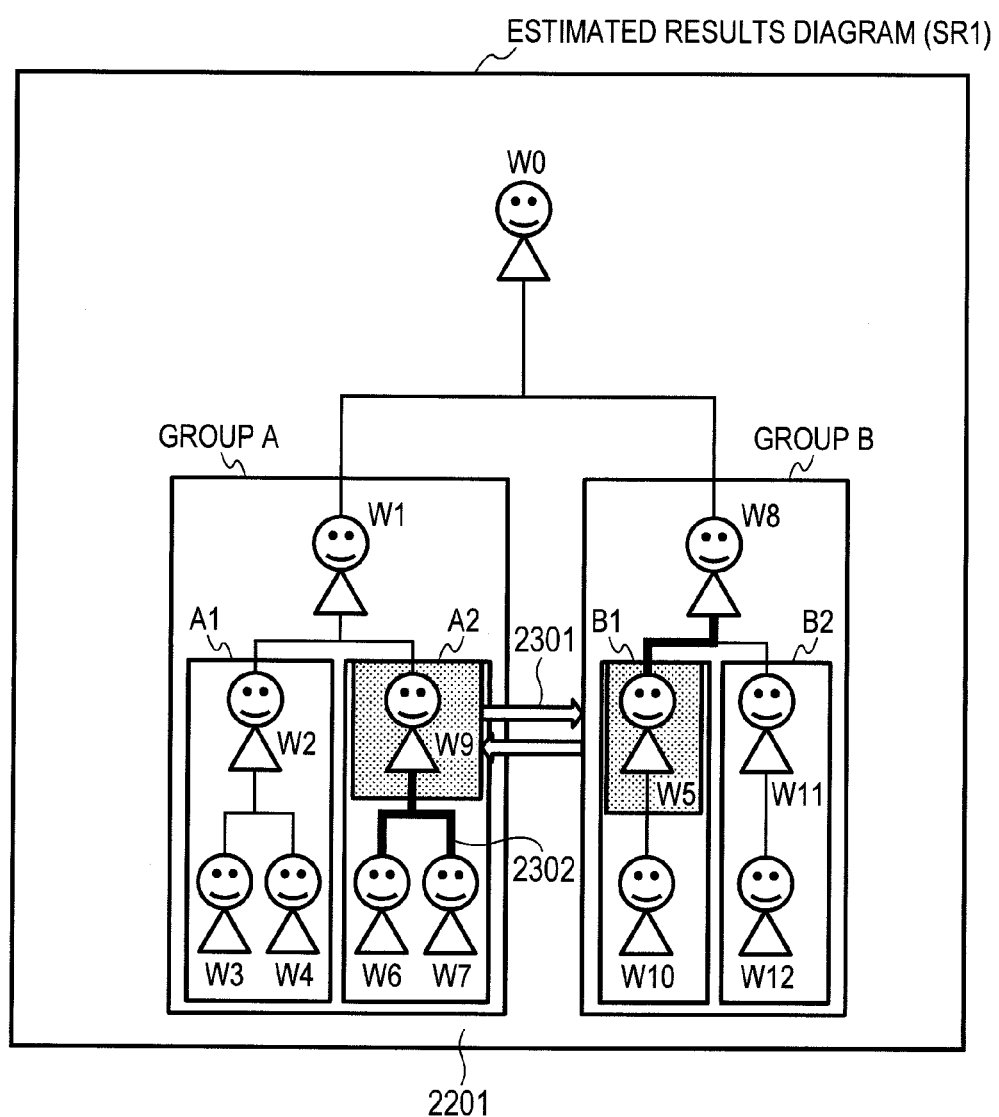
FIG. 23 is a drawing for describing the estimated results diagram shown on the display unit of the embodiment of the present invention.

FIG. 23 is a drawing of the estimated results diagram shown on the display unit DISP1 of the embodiment of the present invention.

The estimated results diagram SR1 is a first display example shown on the display unit DISP1 for the estimated relation flow (FIG. 18) from the estimated relation characteristic display process 1810. The estimated results diagram SR1 includes the post-structural change organization chart 2201, and also includes an enhanced display using hatching 2301 for example to show the change in the structural positions of workers (in this example, worker W9 and W5) after the structural change. Moreover, this first display example also shows estimated results for relation characteristic quantities (e.g. face-to-face time RCH1) between workers in the organization after the structural change that were calculated using the formula (4) (or formula (5) serving as a specific example of formula 4)). These estimated results may be displayed overlapped onto the organizational chart for example by way of the thickness of the edge 2302 the same as in FIG. 20. In comparing the example in FIG. 23 with the example in FIG. 20, one can see that making the structural change is estimated to increase the face-to-face time between the subordinate and boss in team A2, and the face-to-face time between the group B leader and the team B leader in both cases.

Figure 24:
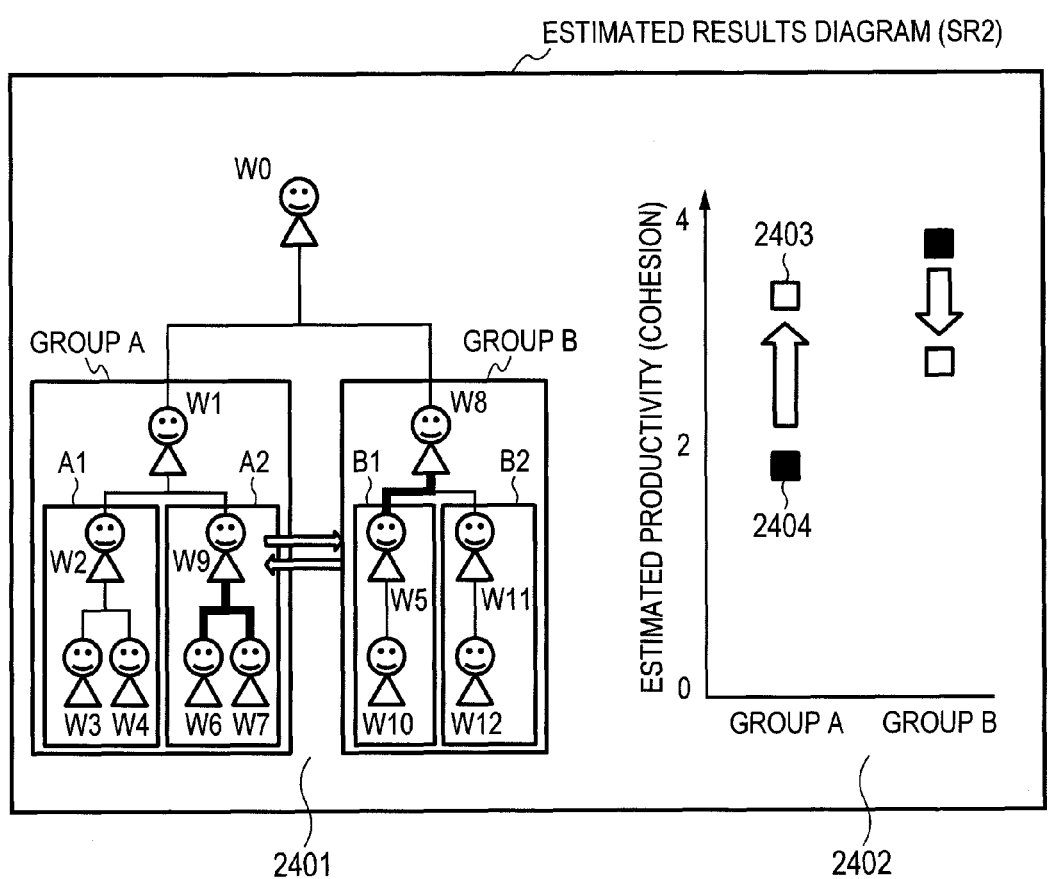
FIG. 24 is a drawing for describing the estimated results diagram including the display of the estimated productivity shown on the display unit of the embodiment of the present invention.

FIG. 24 is a drawing of the estimated results diagram SR2 including a display of the estimated productivity shown on the display unit DISP1 of the embodiment.

The estimated results diagram SR2 is a second display example shown on the display unit DISP1 of the estimated relation flow (FIG. 18) from the estimated relation characteristic display process 1810. Here, individual productivity can be estimated from the network index after understanding the network structure for the face-to-face meeting within the organization as described in the literature by; Lynn and others, "Mining Face-to-Face Interaction Networks Using Sociometric Badges: Evidence Predicting Productivity in IT Configuration", International Conference on Information Systems (France), Dec. 14, 2008. Along with the estimated face-to-face time within the organization, FIG. 4 shows a method for displaying the predicted productivity of the organization that utilizes cohesion which is one network index. This cohesion is described later on (FIG. 28). In addition to the organization chart 2401 displaying the relational characteristic quantities the same as in the estimated results diagram SR1, the estimated results diagram SR2 also includes a graph 2402 showing in what way the cohesion in each group changed due to structural change. The graph 2402 for example displays the pre-structural change productivity (namely, cohesion) 2404 of group A and the predicted productivity 2403 after the structural change. The example in FIG. 24 predicts that the productivity of group A will improve after the structural change. These estimated results therefore allow knowing whether the applicable structural change will be good for each individual group, and whether an overall balance is achieved.

FIG. 28 is a drawing for describing the cohesion utilized as an index for productivity in the embodiment of the present invention.

Cohesion is an index showing the degree to which a person i and the persons surrounding the person i are mutually linked with each other. Here, "surrounding the person i" signifies the scope of the persons directly linked with the person i within the network of the entire organization, and in network analysis terminology this is referred to as the "Egocentric network".

Figure 28A:
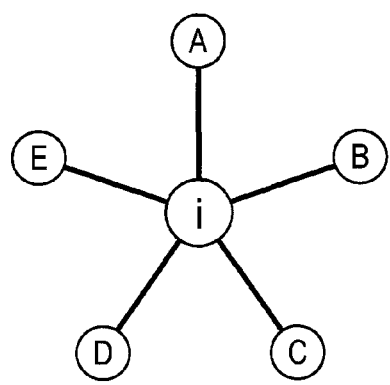
FIG. 28 is a drawing for describing the cohesion utilized as an index for productivity in the embodiment of the present invention.
Figure 28B:
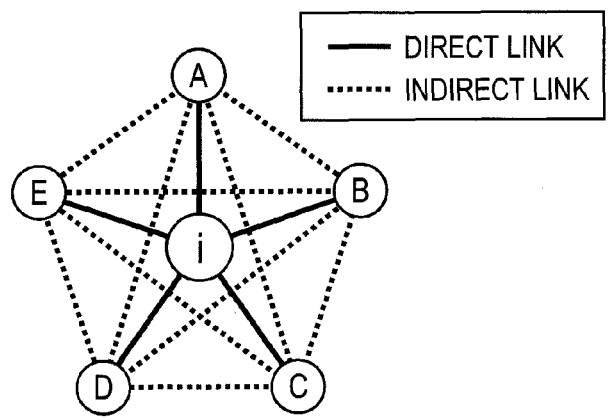

FIG. 28 shows examples of the egocentric network for the person i extracted from the organization network. Here, when there is no link whatsoever with the persons surrounding the person i, then the network is comprised of a star configuration centering on the person i, and in this case the cohesion is low (FIG. 28A). However when there are mutual links with all the persons surrounding person i then the network is comprised of a mesh configuration, and in this case the cohesion is high (FIG. 28B).

Figure 28C:
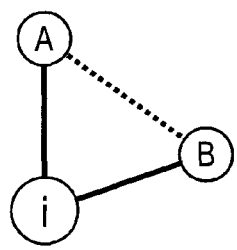

A method for calculating the cohesion Ci of a person is shown in formula (6). The degree Ni denotes the number of persons linked to the person i. Indirect links indicate those links not directly connected to the person i. In an egocentric network, adding one indirect link adds one triangle between the three persons comprised of the person and another two persons (FIG. 28C). In other words, the maximum number of indirect links Li_Max within the egocentric network for person i is the maximum number of triangles that the person i can form, and the actual number of direct links Li expresses the actual number of triangles around person i. Adding a 1 through (Ni−1) to the share of triangles signifies a cohesion Ci that is an average number of links (including links with the person i) within the egocentric network where the person i and (other) persons are linked. A degree of 0 or 1 indicates the cohesion is set to 1. If finding the cohesion for a team, group, or organization rather than an individual, then a figure found from averaging each of the individual teams, groups and so on may be used.

$$Ci = \frac{Li}{Li\_MAX} * (Ni - 1) + 1 \quad (6)$$

Research performed by the present inventors when investigating the quality of business reports and cohesion time changes within an organization revealed that in a half-year period, the creativity index of the business reports was improved 1.8 in the same period that cohesion improved 1.5 times. Cohesion and high productivity are therefore reported as having a positive correlation. Cohesion is therefore effective when utilized as a marker for evaluating organizations.

Figure 25:
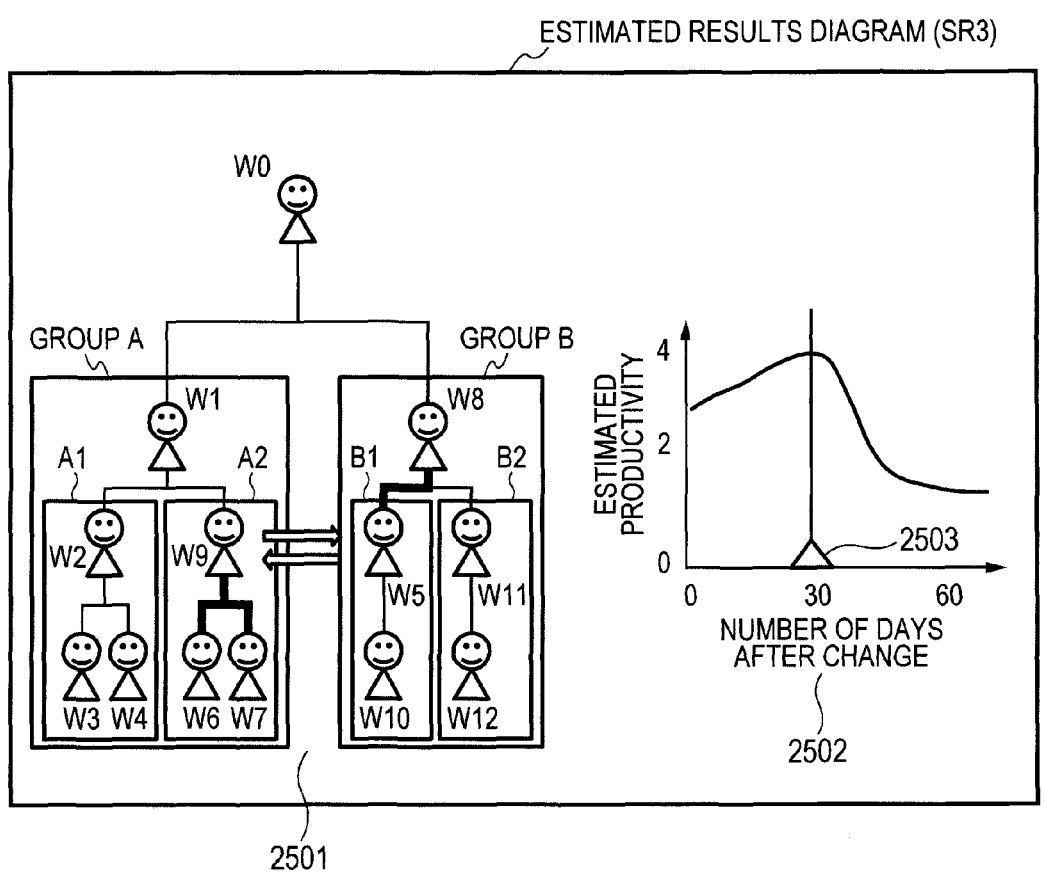
FIG. 25 is a drawing for describing the estimated results diagram including the display of the change in the estimated productivity shown on the display unit of the embodiment of the present invention.

FIG. 25 is a drawing of the estimated results diagram SR3 including the display of the change in the estimated productivity shown on the display unit DISP1 of the embodiment of the present invention.

The estimated results diagram SR3 is a third display example shown on the display unit DISP1 of the estimated relation flow (FIG. 18) from the estimated relation characteristic display process 1810. The estimated results diagram SR3 includes a graph 250 displaying results from estimating how organization cohesion will be changed due to structural changes, as well as an organization chart 2501 displaying characteristic quantities the same as in the estimated results diagram SR1.

Time-related changes in an organization cohesion over time can be estimated by altering the number of days in the period ANT for learning in the learn coefficient process 1801. Setting the learning period for example to the first one month, next one month, and further next one month, after a past structural change, where each period is shifted one month each gives an estimate parameter set (namely the coefficient matrix A and coefficient b) for each respective period. Utilizing each of these parameters allows estimating the state one month, two month, and three months after the structural change. If the cohesion can be calculated based on the state of the organization predicted in this way for each period then then changes in cohesion occurring along a time series can be predicted.

Further, a specified number of elapsed days after a structural change can be displayed as shown in the relation characteristic quantity organization chart 2503 by utilizing the bar 2503 to change the number of days after the structural change. In FIG. 25, the bar 2503 is specifying 30 days elapsing after a structural change and so the relation characteristic quantities predicted to occur 30 days after the structural change can be displayed in the relation characteristic quantity organization chart 2501.

Figure 26:
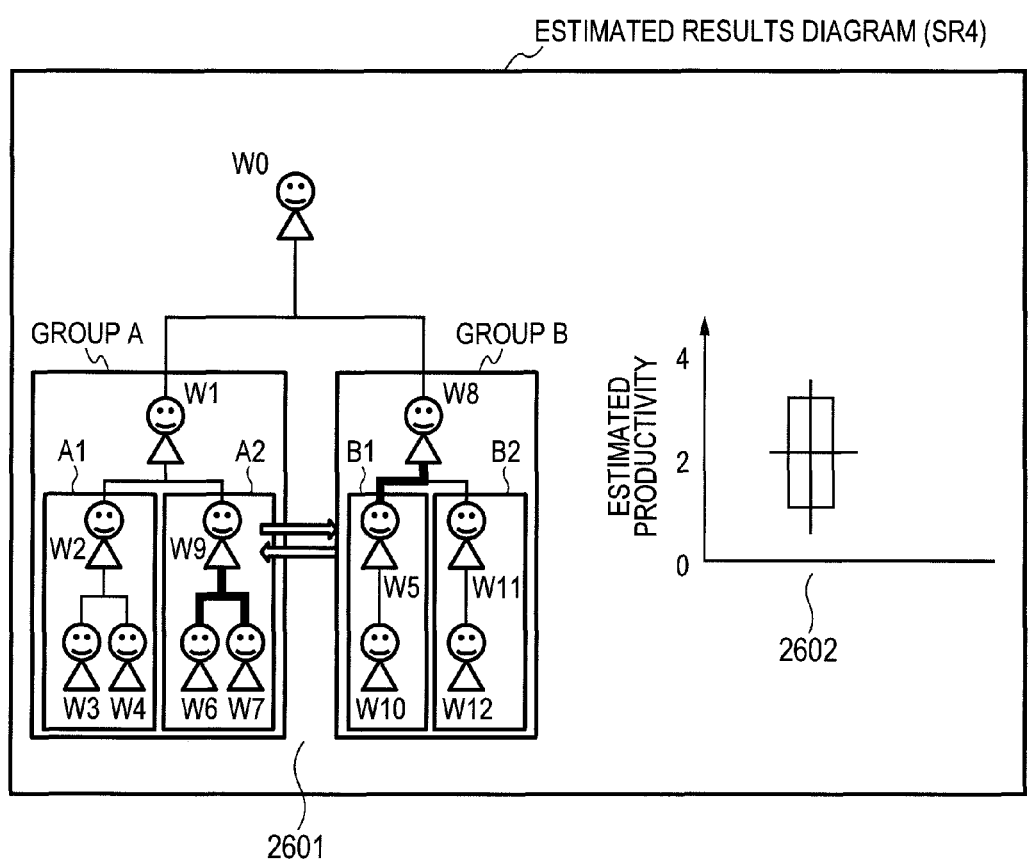
FIG. 26 is a drawing for describing the estimated results diagram including a display of the probability width for the estimated productivity shown on the display unit of the embodiment of the present invention.

FIG. 26 is a drawing for describing the estimated results diagram SR4 including a display of the probability width for the estimated probability shown on the display unit DISP1 of the embodiment of the present invention.

The estimated results diagram SR4 is a fourth display example shown on the display unit DISP1 of the estimated relation flow (FIG. 18) from the estimated relation characteristic display process 1810. In addition to the organization chart 2601 displaying the relational characteristic quantities the same as in the estimated results diagram SR1, the estimated results diagram SR4 also includes a graph 2602 showing the probability width of the estimate results for organization cohesion. In the estimated results diagram SR1, when a two-person estimated face-to-face quantity (e.g. the estimated face-to-face time RCH1) exceeded a preset threshold then those two persons were judged as linked, and a network index was calculated based that result. Here however, the estimated face-to-face quantity also signifies the inclusion of a probability width. In actual usage, the process randomly varies each two-person estimated face-to-face quantity at a specified width and specified count (e.g. 10 time at a 30% rise or drop in width), successively records the cohesion for each of those results, and displays the average value, ±1σvalue, maximum value, and minimum value distribution for those results, as the estimated probability in a box plot.

Figure 27:
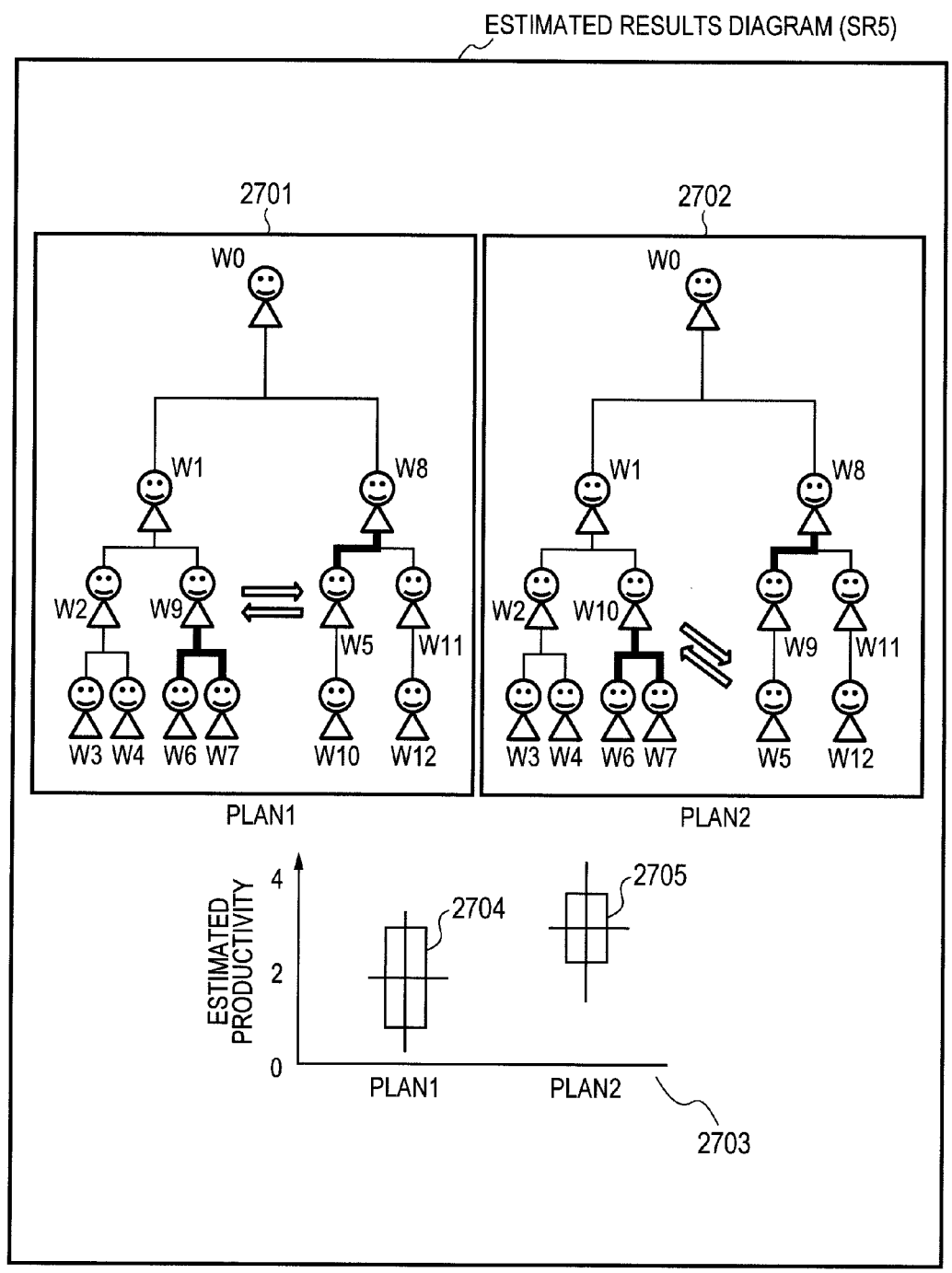
FIG. 27 is a drawing for describing the estimated results diagram corresponding to the plural selected states, shown on the display unit of the embodiment of the present invention.

FIG. 27 is a drawing for describing the estimated results diagram SR5 corresponding to the plural selected states shown on the display unit DISP1 of the embodiment of the present invention.

The estimated results diagram SR5 is a fifth display example shown on the display unit DISP1 of the estimated relation flow (FIG. 18) from the estimated relation characteristic display process 1810. Here for example, when the user wants to decide which of two structural change plans to utilize, the use can simultaneously display the estimated results when these plans have been input as an estimated results diagram SR4 on the display unit DISP1, and can also display the respected estimated productivity of each plan. Estimated results based on the first structural change plan (interchanging the workers W5 and W9 in the organization shown in FIG. 3) can be displayed for example as an organization chart 2701 and a box plot 2704 of the graph 2703 showing the relation characteristic quantities; and estimated results based on the second structural change plan (interchanging the workers W5 and W10 in the organization shown in FIG. 3) can be displayed as an organization chart 2702 and a box plot 2705 showing the relation characteristic quantities. When in doubt about which of the two structural change plans to employ, the user can in this way easily compare the two plans.

Figure 30:
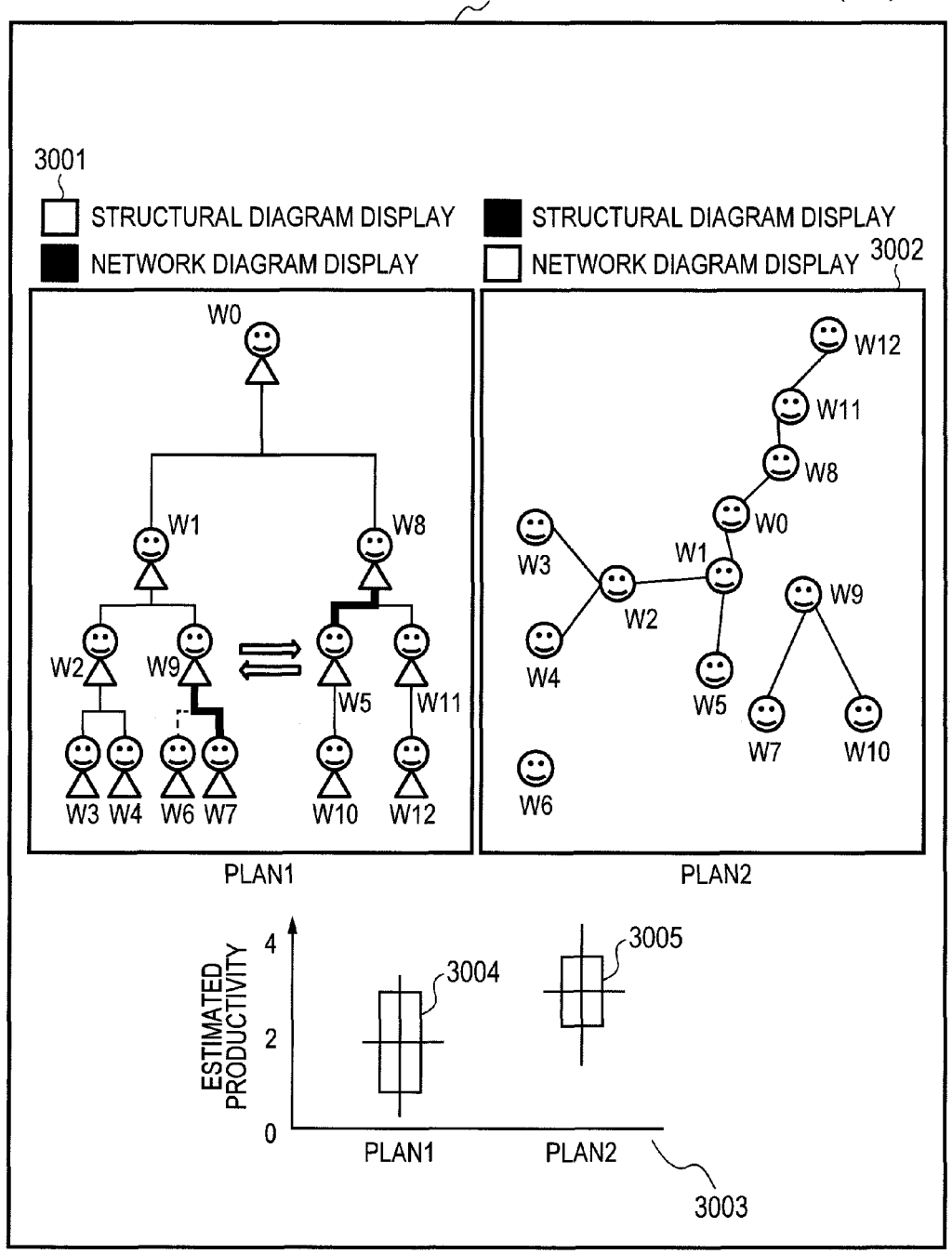
FIG. 30 is a drawing for describing the estimated results diagram corresponding to the plural selected states, shown on the display unit of the embodiment of the present invention.

FIG. 30 is a drawing for describing the estimated results diagram SR6 corresponding to the plural selected states shown on the display unit DISP1 of the embodiment of the present invention.

The estimated results diagram SR6 is a sixth display example of estimated results shown on the display unit DISP1 of the estimated relation flow (FIG. 18) from the estimated relation characteristic display process 1810. The estimated results diagram SR6 includes a checkbox 3001, and other than the point that input by the user utilizing this checkbox 3001 displays a network diagram instead of an organization chart including a display of the relation characteristic quantities (structural diagram) is identical to the estimated results diagram SR5.

The network diagram shown here instead of the displaying a structural diagram is made the same way as shown in FIG. 21. The network diagram 3002 shown in FIG. 30 is a network diagram of the relation characteristic quantities displayed in the organization chart 2702 in FIG. 27. The box plots 3004 and 3005 displayed in the graph 3003 in FIG. 30 are respectively equivalent to the box plots 2704 and 2705 shown in the graph 2703 in FIG. 27.

What is claimed is:

1. An information processing system comprising:
 a plurality of terminals attached to the persons comprising an organization;
 a base station to communicate with the terminals; and
 a management server coupled by way of a network to the base station,
 wherein each terminal includes a behavioral information sensor to acquire behavioral information of the person wearing the terminal, the behavioral information sensor including:
  a face-to-face sensor to detect a face-to-face meeting between the person wearing the terminal and another person wearing the terminal, and
  at least one of an acceleration sensor to detect acceleration and a voice sensor to detect voices, and
 each terminal includes a transmit device to send the behavioral information to the base station, the behavioral information including:
  face-to-face information corresponding to the face-to-face meeting between the person wearing the terminal and the other person wearing the terminal, and
  at least one of acceleration information from the acceleration sensor and voice information from the voice sensor;
 wherein the management server comprising a network interface coupled to the network, a processor coupled to the network interface, and a storage device coupled to the processor,
 wherein the storage device stores a plurality of organizational relationships in an organizational structure among the plurality of persons within the organization, and
 wherein the processor:
 stores the behavioral information received by way of the network interface into the storage device,
 calculates a relational characteristic quantity of one or more types for each person in each of the organizational relationships relative to each other person in the organizational relationship based on at least one of the face-to-face information, the acceleration information and the voice information, wherein the relational characteristic quantity comprises at least one of a face-to-face time between the person and the other person, a bidirectional time where the person and the other person were both active, a pitcher time where the person was active and the other person was inactive, a catcher time where the person was inactive and other person was active, a sit-together time where the person and the other person were both inactive, and a synchronicity degree where the person transits from inactive to active when the other person is active,
 calculates a relational coefficient based on a change in the relational characteristic quantity resulting from a past change in one or more of the organizational relationships in the organization structure,
 receives a proposed change in one or more of the organizational relationships in the organizational structure,
 determines a change in the relational characteristic quantity of each person in the organizational structure resulting from the proposed change in the one or more organizational relationships using the calculated relational coefficient, and
 outputs the change in the relational characteristic quantity of each person in the organizational structure resulting from the proposed change in the one or more organizational relationships.

2. The information processing system according to claim 1,
 wherein the behavioral information includes at least one of the acceleration information as an acceleration record and the voice information as a voice record, and
 wherein the processor determines whether each person is active based on the acceleration information or the voice information.

3. The information processing system according to claim 2,
 wherein the processor:
 calculates the relational coefficient showing the extent that each type of relational characteristic quantity in the specified period after the proposed change in the one or more organizational relationships is dependent on each type of relational characteristic quantity before the proposed change in the one or more organizational relationships, based on the relational characteristic quantity before the proposed change in the one or more organizational relationships that was implemented in the past, and the relational characteristic quantity for a specified period after the proposed change in the one or more organizational relationships that was implemented in the past, and
 determines the relational characteristic quantity of the person for the specified period after the proposed change in the one or more organizational relationships based on the calculated relational coefficients.

4. The information processing system according to claim 3,
 wherein the processor:
 calculates the relational coefficient corresponding to each of the plural specified periods, showing the extent that each type of relational characteristic quantity in the specified period after the proposed change in the one or more organizational relationships is dependent on each type of relational characteristic quantity before the proposed change in the one or more organizational relationships, based on the relational characteristic quantity before the proposed change in the one or more organizational relationships that was implemented in the past, and the relational characteristic quantity for a plurality of specified periods after the proposed change in the one or more organizational relationships that was implemented in the past, and determines the relational characteristic quantity of the person for each of the plural specified periods after the proposed change in the one or more organizational relationships based on the calculated relational coefficients respectively corresponding to the plural specified periods.

5. The information processing system according to claim 3,
wherein the processor calculates the relational coefficient by machine learning using a response variable as the relational characteristic quantity for the specified period after the proposed change in the one or more organizational relationships that was implemented in the past; and using an explanatory variable as the relational characteristic quantity for the specified period before the proposed change in the one or more organizational relationships that was implemented in the past.

6. The information processing system according to claim 1,
wherein the organizational relationships includes at least one from among a group relation of the person belonging to a group in the organization, a positional relation of the person in the chain of command, and a hierarchical relation of the person by job ranking.

7. The information processing system according to claim 1,
wherein one of the types of the relational characteristic quantity comprises a time the person is not face-to-face with the other person.

8. The information processing system according to claim 2,
wherein the processor determines that the person wearing the terminal containing the acceleration sensor is active when the specified conditions for the acceleration frequency detected by the acceleration sensor are satisfied.

9. The information processing system according to claim 1, further comprising:
a display device,
wherein the processor displays the organization chart the organizational structure showing the plurality of organizational relationships among the persons within the organization, and further displays the relational characteristic quantity of the person superimposed on the organization chart.

10. The information processing system according to claim 1, further comprising:
a display device,
wherein the processor represents each person as a node, and displays a spring network diagram utilizing the relational characteristic quantity as the attraction force between nodes, on the display device.

11. The information processing system according to claim 1, further comprising:
a display device,
wherein the processor calculates the cohesion of the organization based on the relational characteristic quantity of each person, and displays the relational characteristic quantity of each person and the calculated cohesion on the display device.

12. The information processing system according to claim 4, further comprising:
a display device,
wherein the processor calculates the cohesion for each of the plural specified periods in the organization based on the relational characteristic quantity of each person for each of the plural specified periods, and displays a graph showing the change in the calculated cohesion on the display device.

13. A management server coupled by way of a network to a base station communicating with a plurality of terminals,
wherein each terminal is attached to each of a plurality of persons comprising the organization, and includes a behavioral information sensor to acquire behavioral information of the person wearing the terminal, the behavioral information sensor including:
a face-to-face sensor to detect a face-to-face meeting between the person wearing the terminal and another person wearing the terminal, and
at least one of an acceleration sensor to detect acceleration and a voice sensor to detect voices, and
each terminal includes a transmit device to transmit the behavioral information to the base station, the behavioral information including:
face-to-face information corresponding to the face-to-face meeting between the person wearing the terminal and the other person wearing the terminal, and
at least one of acceleration information from the acceleration sensor and voice information from the voice sensor;
wherein the management server comprising a network interface coupled to the network, a processor coupled to the network interface, and a storage device coupled to the processor,
wherein the storage device stores a plurality of organizational relationships in an organizational structure among the plurality of persons within the organization, and
wherein the processor:
stores the behavioral information received by way of the network interface into the storage device,
calculates a relational characteristic quantity of one or more types for each person in each of the organizational relationships relative to each other person in the organizational relationship based on at least one of the face-to-face information, the acceleration information and the voice information, wherein the relational characteristic quantity comprises at least one of a face-to-face time between the person and the other person, a bidirectional time where the person and the other person were both active, a pitcher time where the person was active and the other person was inactive, a catcher time where the person was inactive and other person was active, a sit-together time where the person and the other person were both inactive, and a synchronicity degree where the person transits from inactive to active when the other person is active,
calculates a relational coefficient based on a change in the relational characteristic quantity resulting from a past change in one or more of the organizational relationships in the organization structure,
receives a proposed change in one or more of the organizational relationships in the organizational structure,
determines a change in the relational characteristic quantity of each person in the organizational structure resulting from the proposed change in the one or more organizational relationships using the calculated relational coefficients, and
outputs the change in the relational characteristic quantity of each person in the organizational structure resulting from the proposed change in the one or more organizational relationships.

14. The management server according to claim 13,
wherein the behavioral information includes at least one of the acceleration information as an acceleration record and the voice information as a voice record, and wherein the processor
determines whether each person is active based on the acceleration information or the voice information.

15. The management server according to claim 14,
wherein the processor:
calculates the relational coefficient showing the extent that each type of relational characteristic quantity in the specified period after the proposed change in the one or more organizational relationships is dependent on each type of relational characteristic quantity before the proposed change in the one or more organizational relationships, based on the relational characteristic quantity before the proposed change in the one or more organizational relationships that was implemented in the past, and the relational characteristic quantity for a specified period after the proposed change in the one or more organizational relationships that was implemented in the past, and
determines the relational characteristic quantity of the person for the specified period after the proposed change in the one or more organizational relationships based on the calculated relational coefficients.

16. An information processing method for an information processing system including a plurality of terminals attached to each of the persons comprising an organization, a base station to communicate with the terminals, and a management server coupled by way of a network to the base station,
each terminal including a behavioral information sensor to acquire behavioral information of the person wearing the terminal, the behavioral information sensor including:
a face-to-face sensor to detect a face-to-face meeting between the person wearing the terminal and another person wearing the terminal, and
at least one of an acceleration sensor to detect acceleration and a voice sensor to detect voices, and
each terminal includes a transmit device to send the behavioral information to the base station, the behavioral information including:
face-to-face information corresponding to the face-to-face meeting between the person wearing the terminal and the other person wearing the terminal, and
at least one of acceleration information from the acceleration sensor and voice information from the voice sensor;
the management server including a network interface coupled to the network, a processor coupled to the network interface, and a storage device coupled to the processor, and
the storage device storing a plurality of organizational relationships in an organizational structure among the plurality of persons within the organization,
the information processing method comprising:
receiving the behavioral information by way of the network interface;
calculating a relational characteristic quantity of one or more types for each person in each of the organizational relationship relative to each other person in the organizational relationship based on at least one of the face-to-face information, the acceleration information and the voice information, wherein the relational characteristic quantity comprises at least one of a face-to-face time between the person and the other person, a bidirectional time where the person and the other person were both active, a pitcher time where the person was active and the other person was inactive, a catcher time where the person was inactive and other person was active, a sit-together time where the person and the other person were both inactive, and a synchronicity degree where the person transits from inactive to active when the other person is active;
calculating a relational coefficient based on a change in the relational characteristic quantity resulting from a past change in one or more of the organizational relationships in the organization structure;
determining a change in the relational characteristic quantity of each person in the organizational structure resulting from a proposed change in the one or more organizational relationships using the calculated relational coefficients; and
outputting the change in the relational characteristic quantity of each person in the organizational structure resulting from the proposed change in the one or more organizational relationships.

17. The information processing method according to claim 16,
wherein the behavioral information includes at least one of the acceleration information as an acceleration record and the voice information as a voice record, and
wherein calculating the relational characteristic quantity further includes
determining whether the person is active based on the acceleration information and the voice information.

18. The information processing method according to claim 17, further comprising:
calculating the relational coefficient showing the extent that each type of relational characteristic quantity in the specified period after the proposed change in the one or more organizational relationships is dependent on each type of relational characteristic quantity before the proposed change in the one or more organizational relationships, based on the relational characteristic quantity before the proposed change in the one or more organizational relationships that was implemented in the past, and the relational characteristic quantity for the specified period after the proposed change in the one or more organizational relationships that was implemented in the past,
wherein determining the change in the relational characteristic quantity further includes:
determining the relational characteristic quantity of the person for the specified period after the proposed change in the one or more organizational relationships based on the calculated relational coefficients.

* * * * *